US008165988B2

(12) United States Patent
Shau et al.

(10) Patent No.: US 8,165,988 B2
(45) Date of Patent: *Apr. 24, 2012

(54) FAST BATCH LOADING AND INCREMENTAL LOADING OF DATA INTO A DATABASE

(75) Inventors: James Shau, San Jose, CA (US); Krishnan Meiyyappan, Fremont, CA (US); Hung Tran, Sunnyvale, CA (US); Ravi Krishnamurthy, Sunnyvale, CA (US); Kapil Surlaker, Sunnyvale, CA (US); Jeremy Branscome, Santa Clara, CA (US); Joseph I. Chamdani, Santa Clara, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,284

(22) Filed: Jan. 4, 2011

(65) Prior Publication Data

US 2011/0099155 A1    Apr. 28, 2011

Related U.S. Application Data

(63) Continuation of application No. 12/144,303, filed on Jun. 23, 2008, now Pat. No. 7,895,151.

(51) Int. Cl.
*G06F 17/30* (2006.01)
(52) U.S. Cl. .................. 707/602; 707/692; 707/802
(58) Field of Classification Search .................. 707/602, 707/692, 802
See application file for complete search history.

(56) References Cited

U.S. PATENT DOCUMENTS

| 5,265,260 | A | * | 11/1993 | Hendricks | 1/1 |
| 5,386,583 | A | * | 1/1995 | Hendricks | 1/1 |
| 5,544,357 | A | * | 8/1996 | Huei | 707/715 |
| 7,337,176 | B1 | * | 2/2008 | Cheedella et al. | 1/1 |

* cited by examiner

*Primary Examiner* — Cheryl Lewis
(74) *Attorney, Agent, or Firm* — Monument IP Law Group

(57) ABSTRACT

Embodiments of the present invention provide for batch and incremental loading of data into a database. In the present invention, the loader infrastructure utilizes machine code database instructions and hardware acceleration to parallelize the load operations with the I/O operations. A large, hardware accelerator memory is used as staging cache for the load process. The load process also comprises an index profiling phase that enables balanced partitioning of the created indexes to allow for pipelined load. The online incremental loading process may also be performed while serving queries.

3 Claims, 19 Drawing Sheets

FAST BATCH LOADING AND INCREMENTAL LOADING OF DATA INTO A DATABASE

CROSS-REFERENCE TO RELATED APPLICATIONS

This application is a continuation of U.S. patent application Ser. No. 12/144,303 filed on Jun. 23, 2008, entitled "Fast Batch Loading and Incremental Loading of Data in a Database," by James Shau et al., which is herein incorporated by reference in its entirety and is related to the following U.S. patent applications and patents, which are herein incorporated by reference in their entirety: U.S. patent application Ser. No. 11/895,952, filed on Aug. 27, 2007, entitled "Methods and Systems for Hardware Acceleration of Database Operations and Queries," by Joseph I. Chamdani et al.; U.S. patent application Ser. No. 11/895,998, filed on Aug. 27, 2007, entitled "Hardware Acceleration Reconfigurable Processor for Accelerating Database Operations and Queries," by Jeremy Branscome et al.; U.S. patent application Ser. No. 11/895,997, filed on Aug. 27, 2007, entitled "Processing Elements of a Hardware Acceleration Reconfigurable Processor for Accelerating Database Operations and Queries," by Jeremy Branscome et al.; U.S. patent application Ser. No. 12/168,821, filed on Jul. 7, 2008, entitled "Methods and Systems for Generating Query Plans that are Compatible for Execution in Hardware," by Ravi Krishnamurthy et al.; U.S. patent application Ser. No. 12/099,076, filed on Apr. 7, 2008, entitled "Methods and Systems for Run-Time Scheduling Database Operations that are Executed in Hardware," by Joseph I. Chamdani et al.; U.S. patent application Ser. No. 12/144,486, filed on Jun. 23, 2008, entitled "Methods and Systems for Real-time Continuous Updates," by Kapil Surlaker et al.; U.S. patent application Ser. No. 12/099,131, filed on Apr. 7, 2008, entitled "Accessing Data in a Column Store Database Based on Hardware Compatible Data Structures," by Liuxi Yang et al.; and U.S. patent application Ser. No. 12/099,133, filed on Apr. 7, 2008, entitled "Accessing Data in a Column Store Database Based on Hardware Compatible Indexing and Replicated Reordered Columns," by Krishnan Meiyyappan et al.

BACKGROUND

Despite their different uses, applications, and workload characteristics, most systems run on a common Database Management System (DBMS) using a standard database programming language, such as Structured Query Language (SQL). Most modern DBMS implementations (Oracle, IBM DB2, Microsoft SQL, Sybase, MySQL, PostgreSQL, Ingress, etc.) are implemented on relational databases, which are well known to those skilled in the art.

Typically, a DBMS has a client side where applications or users submit their queries and a server side that executes the queries. On the server side, most enterprises employ one or more general purpose servers. However, although these platforms are flexible, general purpose servers are not optimized for many enterprise database applications. In a general purpose database server, all SQL queries and transactions are eventually mapped to low level software instructions called assembly instructions, which are then executed on a general purpose microprocessor (CPU). The CPU executes the instructions, and its logic is busy as long as the operand data are available, either in the register file or on-chip cache. To extract more parallelism from the assembly code and keep the CPU pipeline busy, known CPUs attempt to predict ahead the outcome of branch instructions and execute down the SQL code path speculatively. Execution time is reduced if the speculation is correct; the success of this speculation, however, is data dependent. Other state-of-the-art CPUs attempt to increase performance by employing simultaneous multi-threading (SMT) and/or multi-core chip multiprocessing (CMP). To take advantage of these, changes have to be made at the application or DBMS source code to manually create the process/thread parallelism for the SMT or CMP CPUs. This is generally considered highly undesirable.

Unfortunately, general purpose CPUs are not efficient for database applications. Branch prediction is generally not accurate because database processing involves tree traversing and link list or pointer chasing that is very data dependent. Known CPUs employ the well known code-flow (or Von Neumann) architecture, which uses a highly pipelined instruction flow (rather than a data-flow where operand data is pipelined) to operate on data stored in the CPUs tiny register files. Real database workloads, however, typically require processing Gigabytes to Terabytes of data, which overwhelms these tiny registers with loads and reloads. On-chip cache of a general purpose CPU is not effective since it's relatively too small for real database workloads. This requires that the database server frequently retrieve data from its small memory or disk. Accordingly, known database servers rely heavily on squeezing the utilization of their small system memory size and disk input/output (I/O) bandwidth. Those skilled in the art recognize that these bottlenecks between storage I/O, the CPU, and memory are very significant performance factors.

However, overcoming these bottlenecks is a complex task because typical database systems consist of several layers of hardware, software, etc., that influence the overall performance of the system. These layers comprise, for example, the application software, the DBMS software, operating system (OS), server processor systems, such as its CPU, memory, and disk I/O and infrastructure. Traditionally, performance has been optimized in a database system horizontally, i.e., within a particular layer. For example, many solutions attempt to optimize various solutions for the DBMS query processing, caching, the disk I/O, etc. These solutions employ a generic, narrow approach that still fails to truly optimize the large performance potentials of the database system, especially for relational database systems having complex read-intensive applications. In addition, the known systems often struggle with loading data into databases.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

In addition.

DETAILED DESCRIPTION

Embodiments of the present invention provide for batch and incremental loading of data into a database. In the present invention, the loader infrastructure utilizes machine code database instructions and hardware acceleration to parallelize the load operations with the I/O operations. A large, hardware accelerator memory is used as staging cache for the load process. The load process also comprises an index profiling phase that enables balanced partitioning of the created indexes to allow for pipelined load. The online incremental loading process may also be performed while serving queries.

Figure 1:
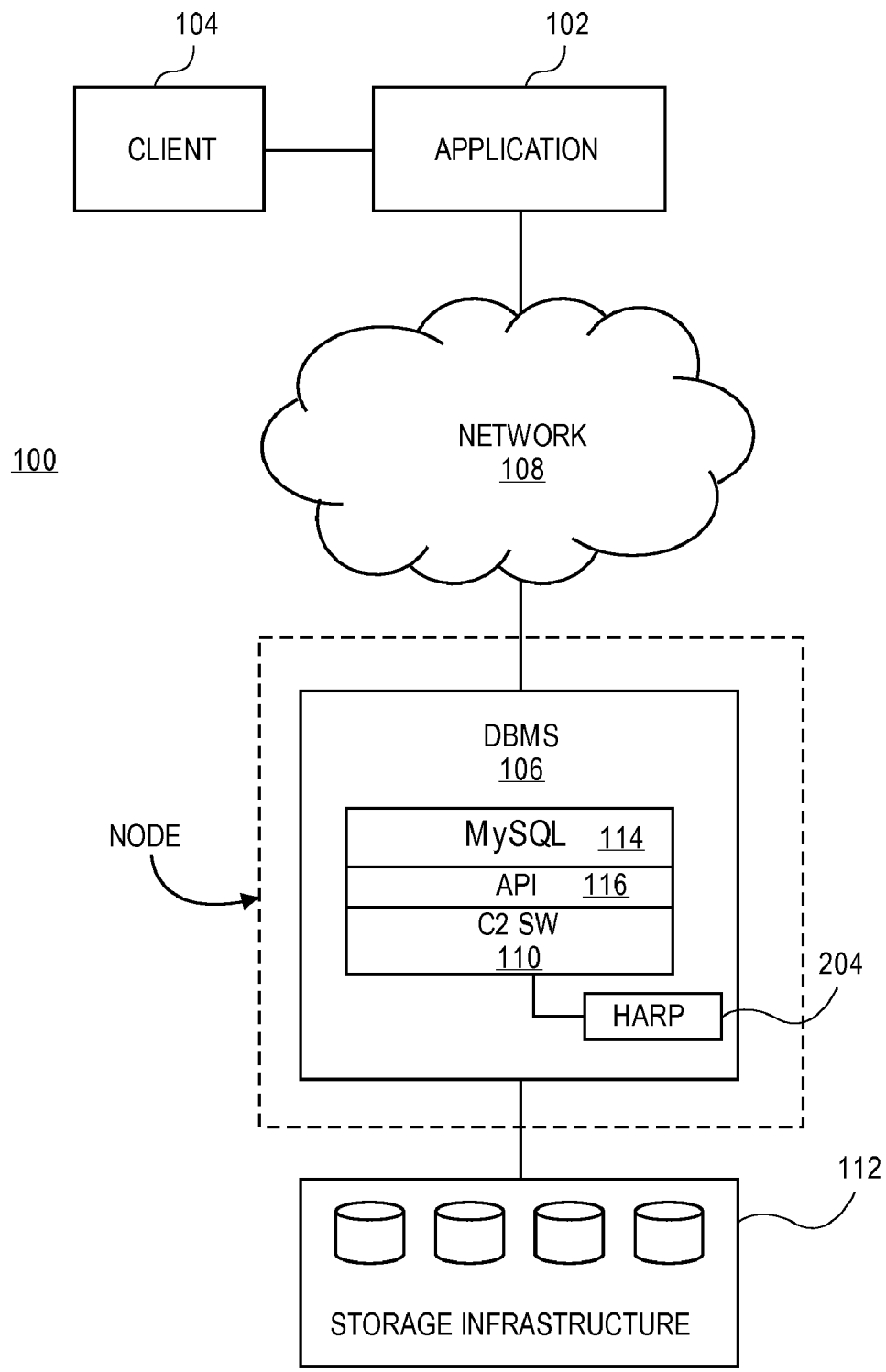
FIG. 1 illustrates an exemplary system that is consistent with the principles of the present invention.
Figure 2:
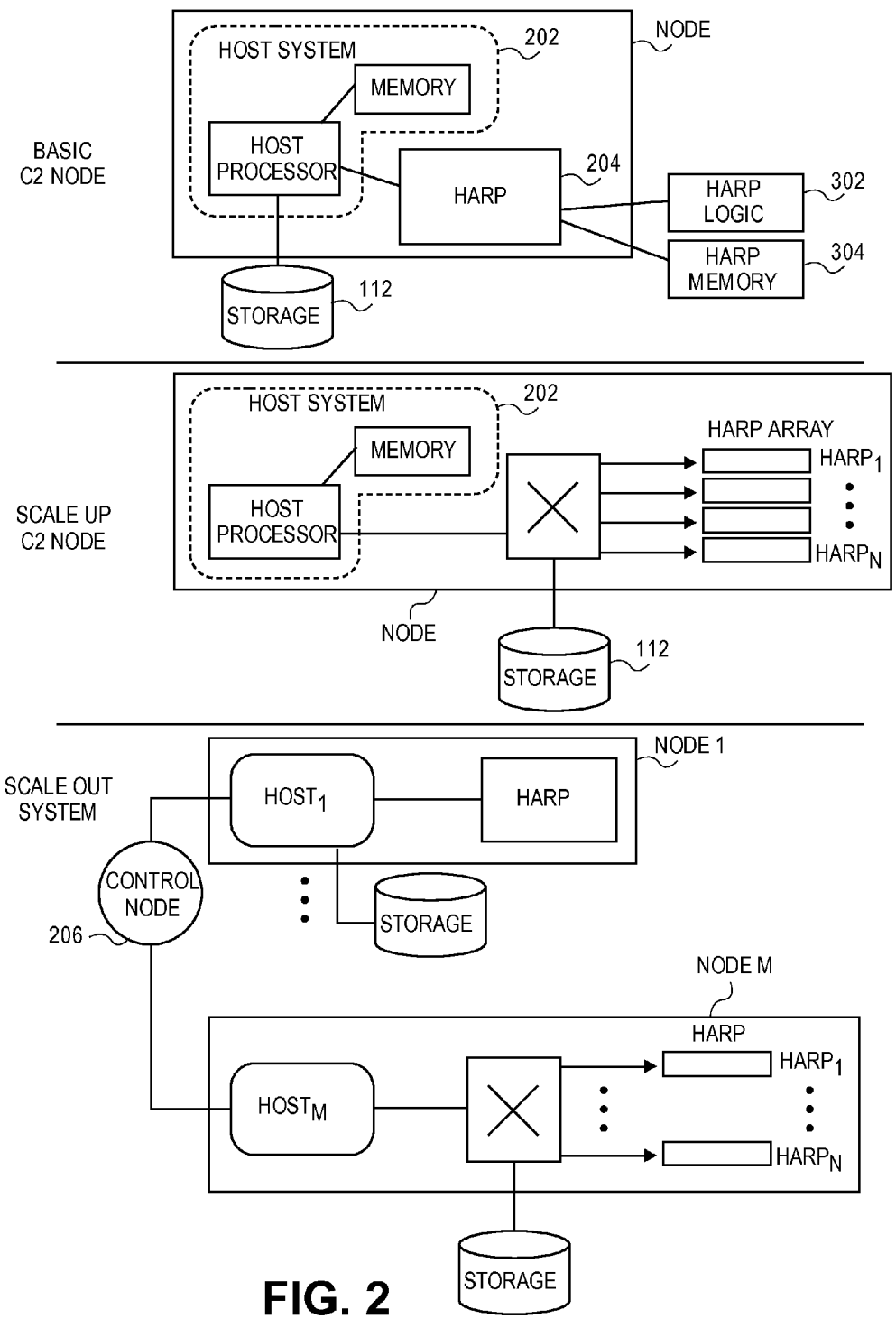
FIG. 2 illustrates exemplary system topologies that are consistent with the principles of the present invention.
Figure 3:
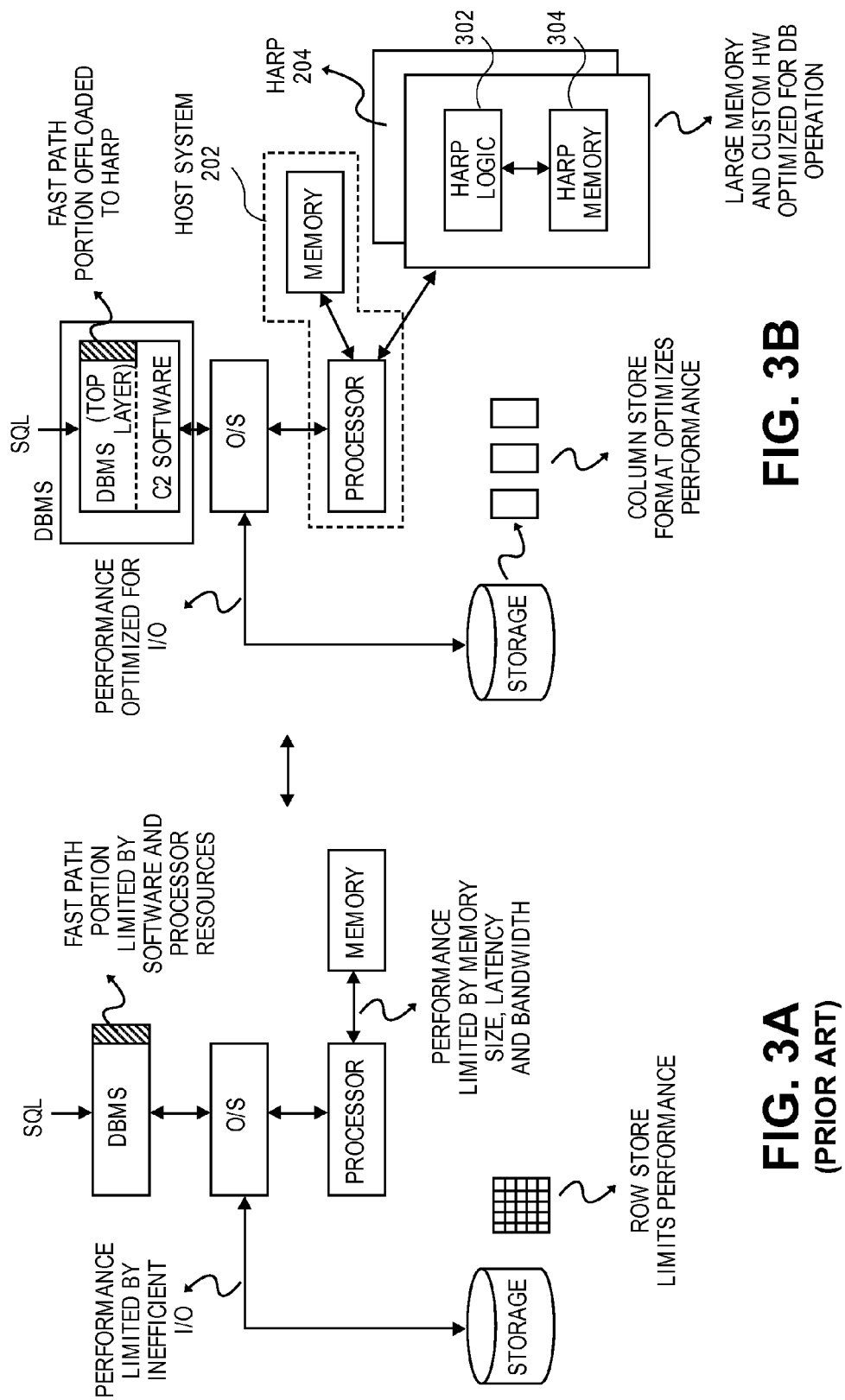
FIG. 3A illustrates a prior art database system and FIG. 3B illustrates an exemplary implementation of the C2 solution for the present invention.
Figure 4:
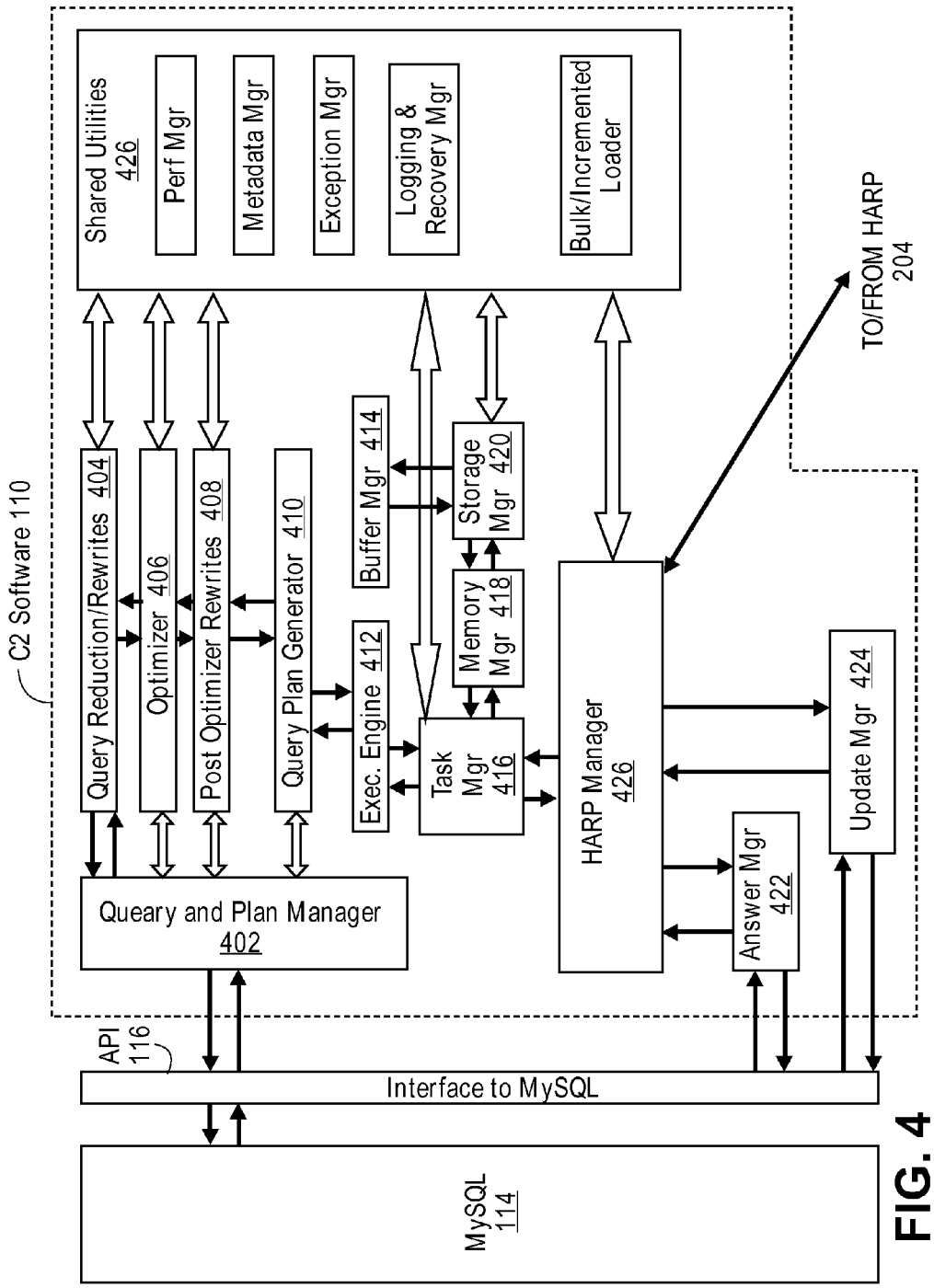
FIG. 4 illustrates a functional architecture of the custom computing (C2) software of the present invention.
Figure 5:
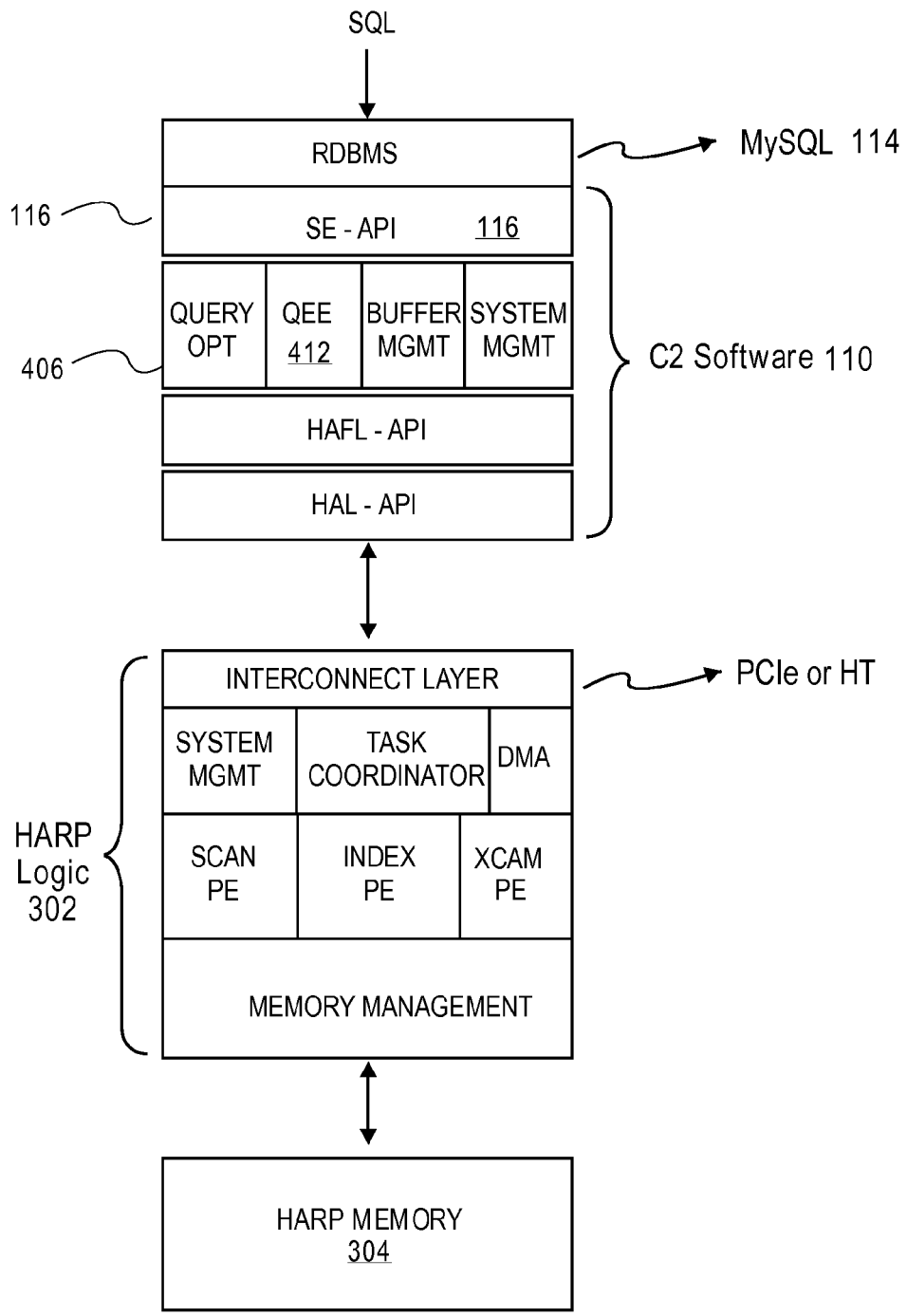
FIG. 5 illustrates a protocol stack employed by the C2 software and a Hardware Acceleration Reconfigurable Processor (HARP) of the present invention.
Figure 6:
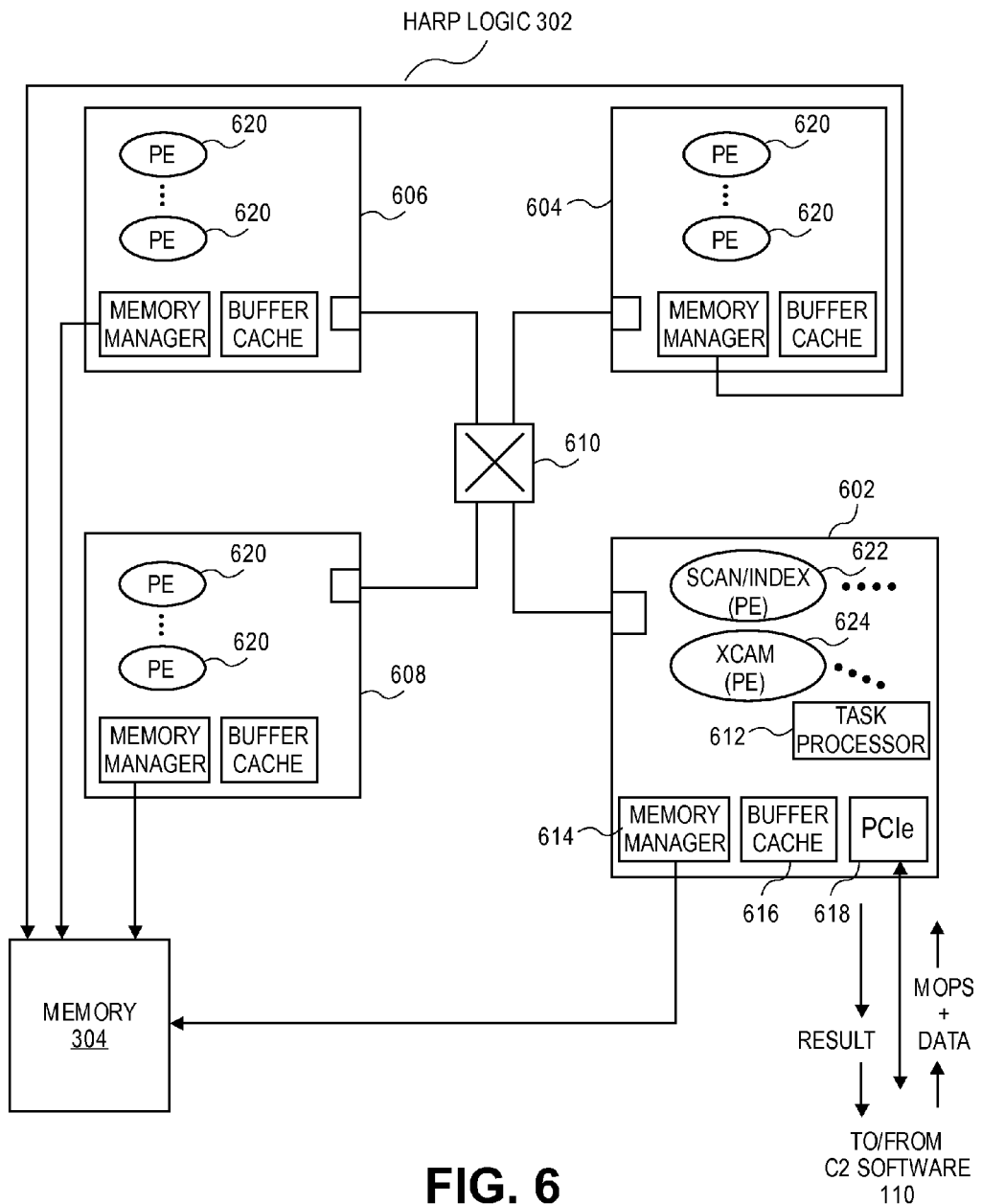
FIG. 6 illustrates an exemplary architecture of a HARP.
Figure 7:
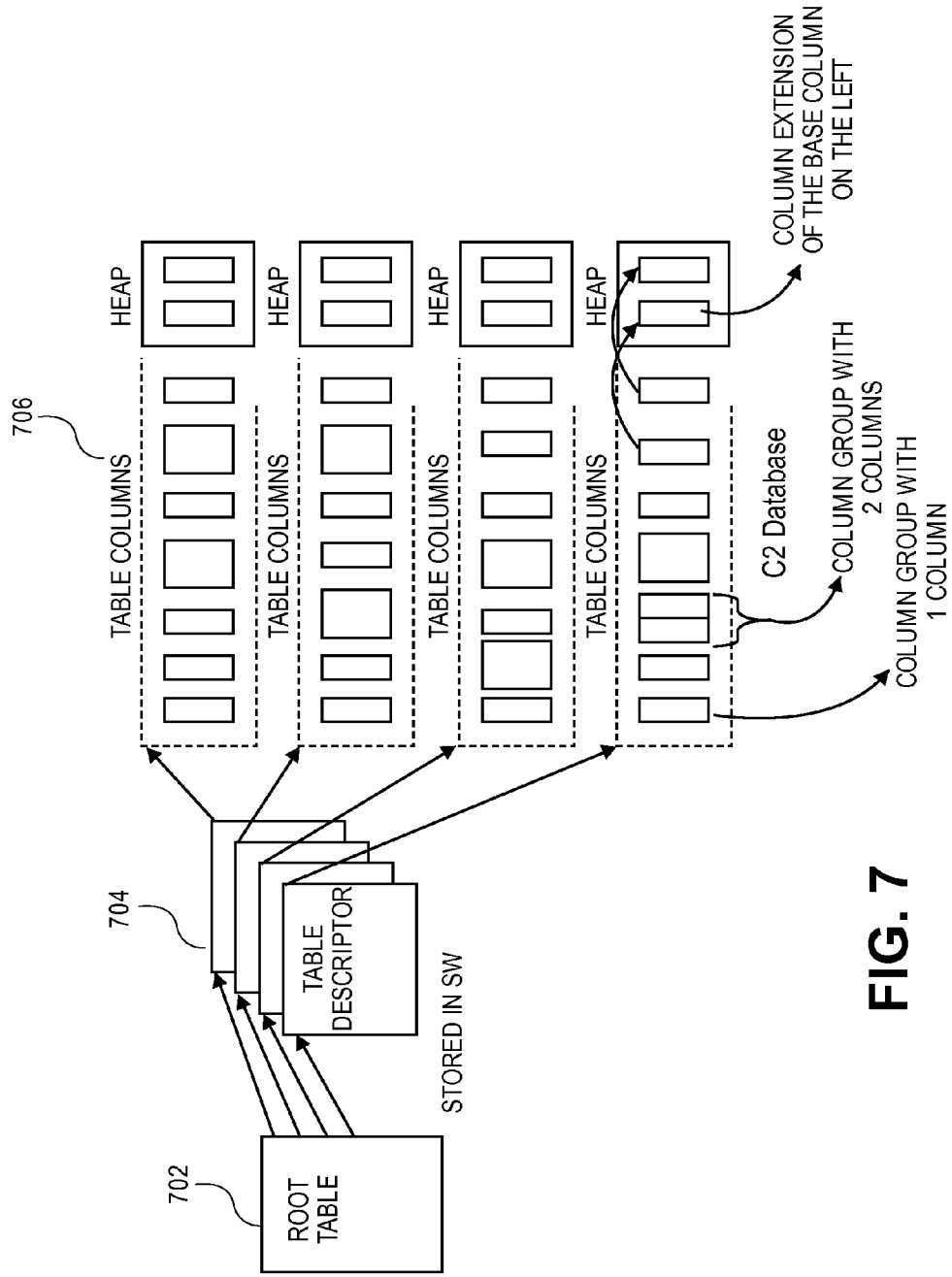
FIG. 7 illustrates a column store database and associated data structures employed by some embodiments of the present invention.
Figure 8:
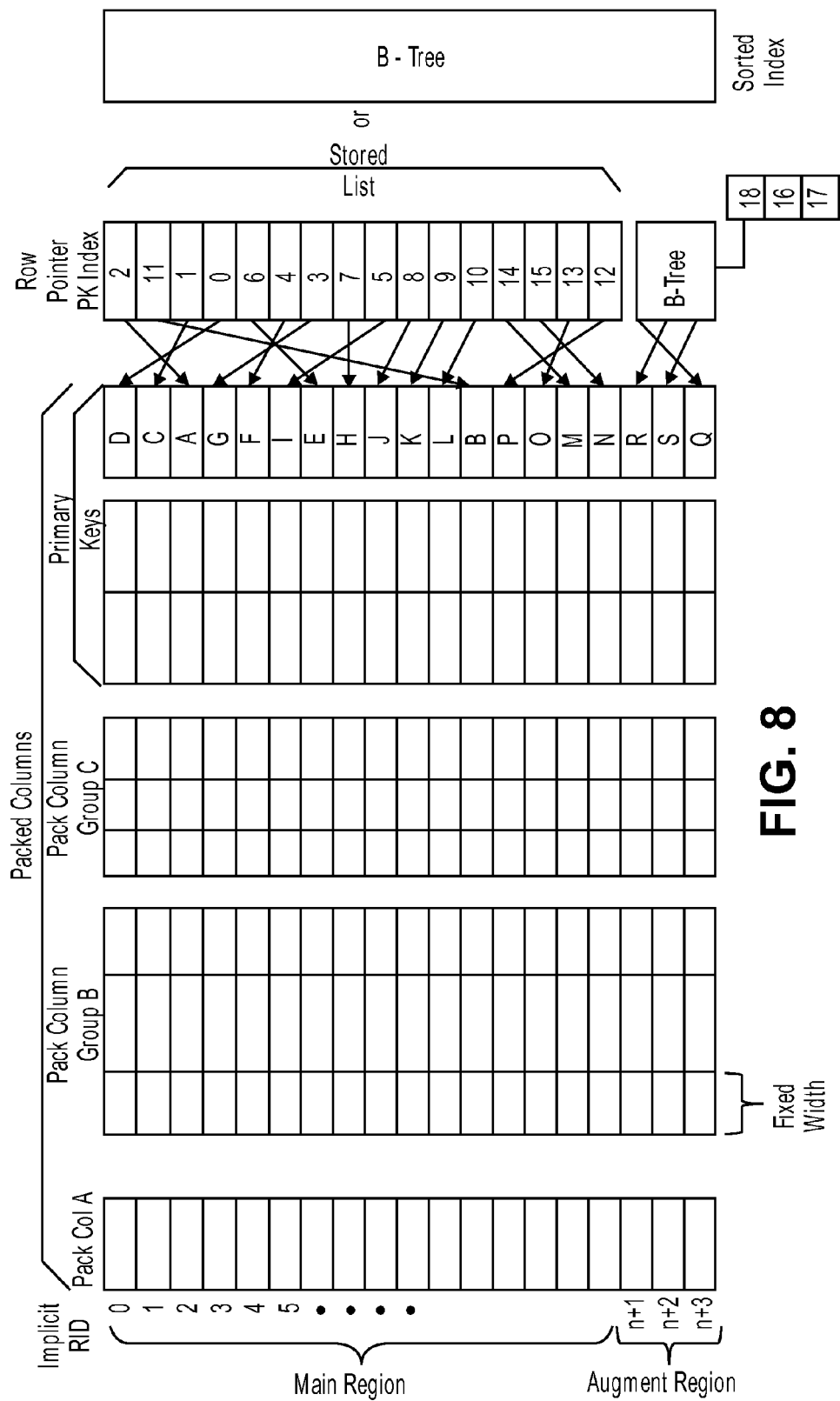
FIG. 8 illustrates a table column layout and associated data structures employed by some embodiments of the present invention.
Figure 9:
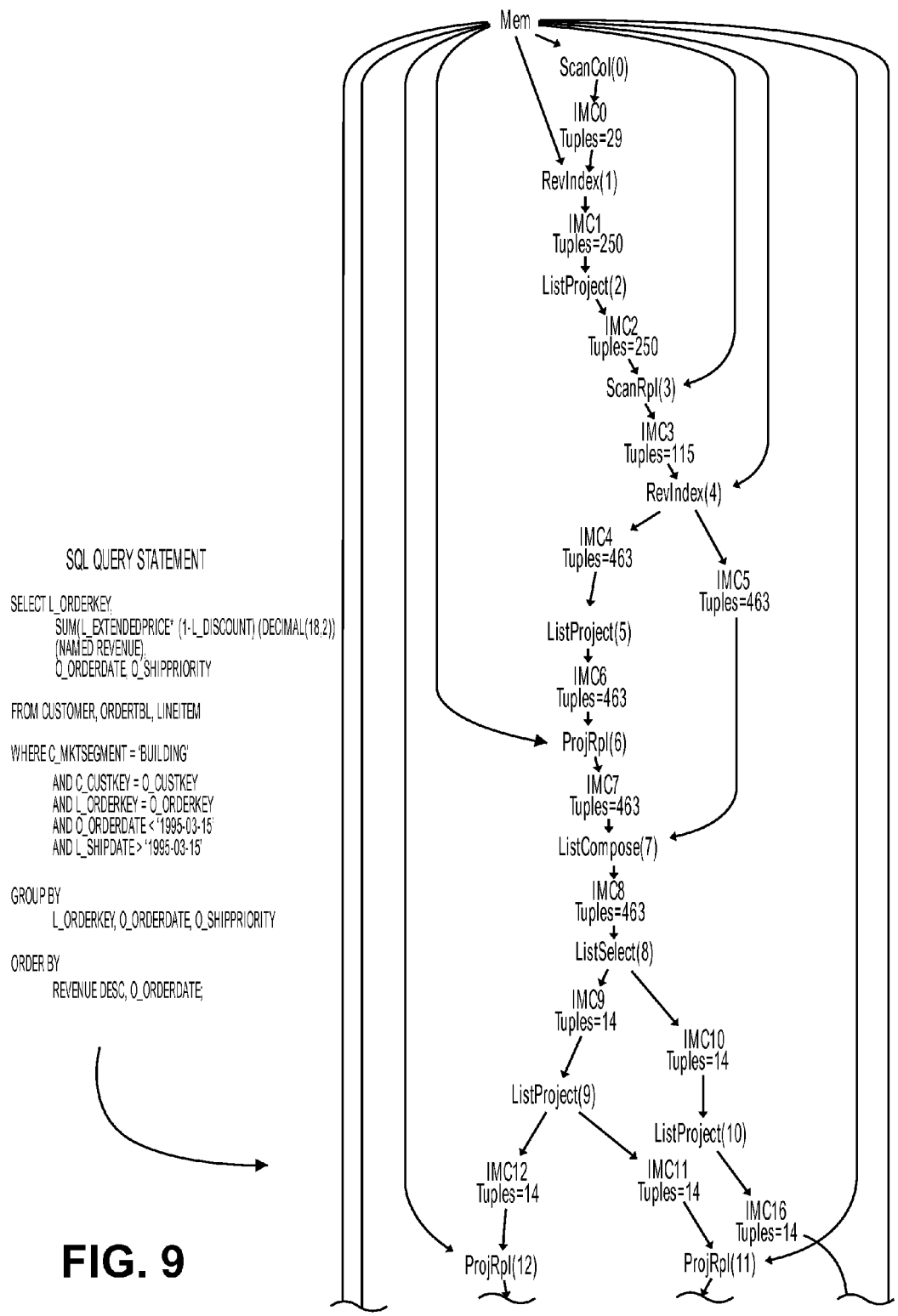
FIG. 9 illustrates an exemplary machine code database instruction flow for a SQL query that is consistent with the principles of the present invention.
Figure 9:
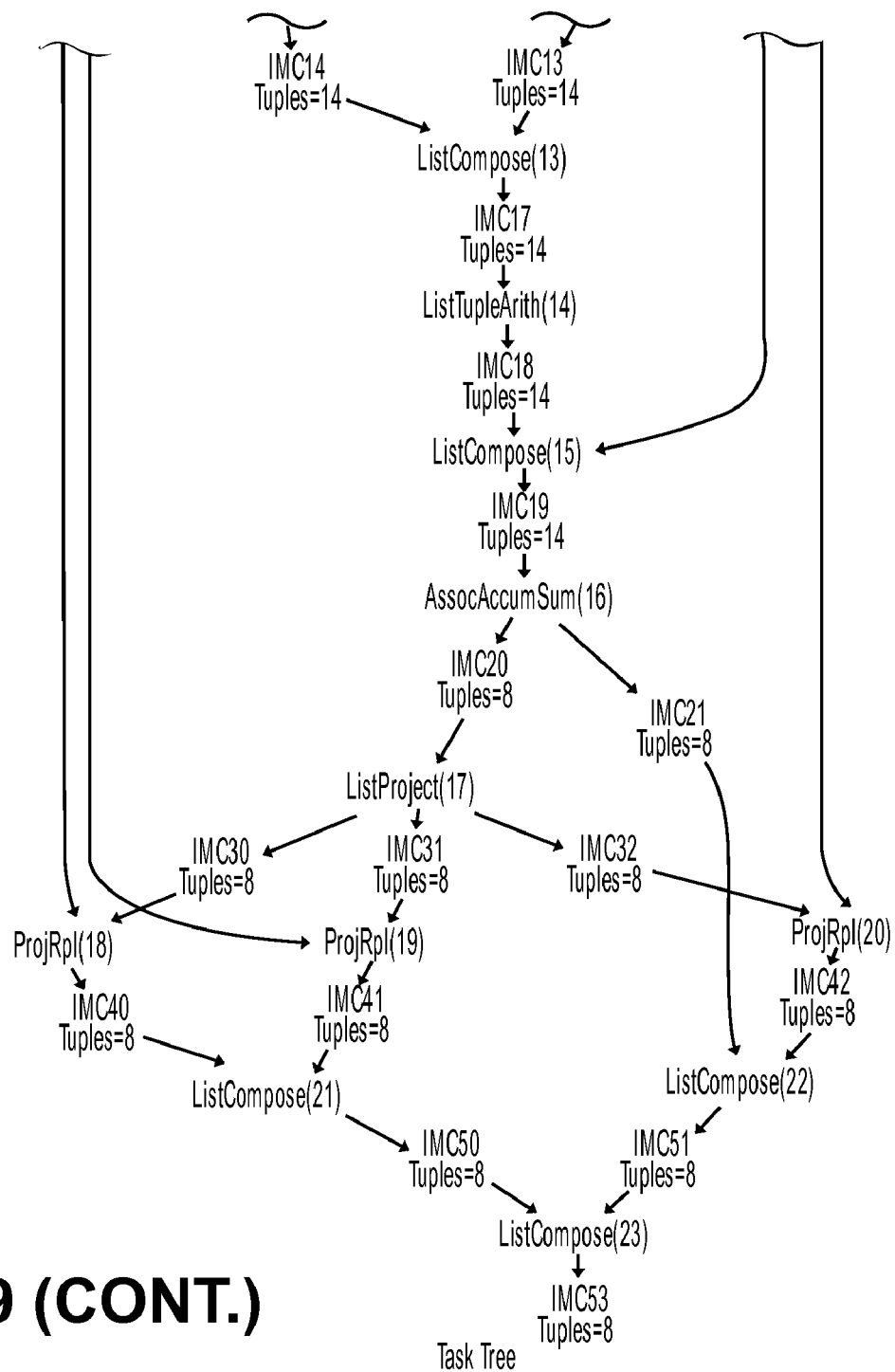
Figure 10:
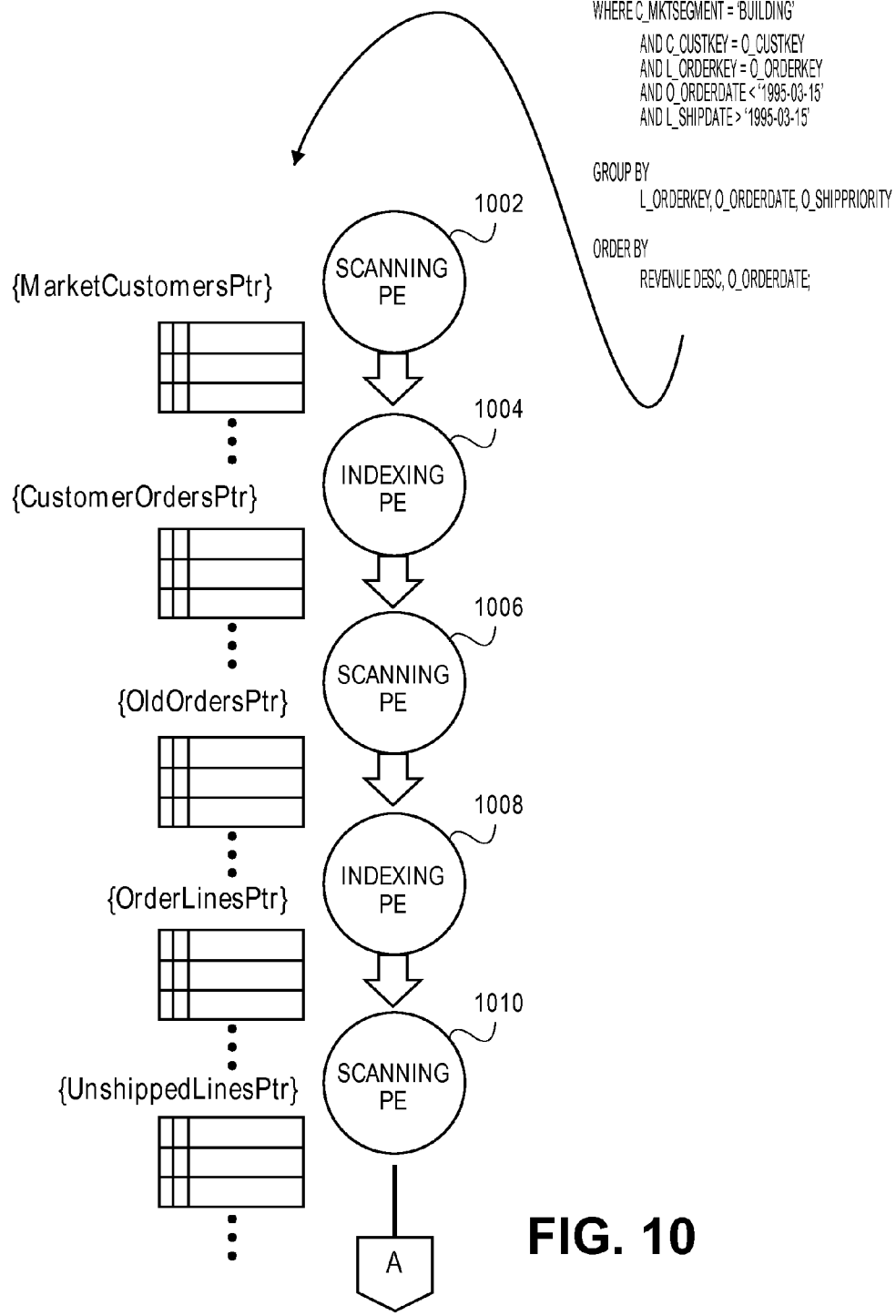
FIG. 10 illustrates an exemplary dataflow for a SQL query through processing elements in the HARP in accordance with the principles of the present invention.
Figure 10:
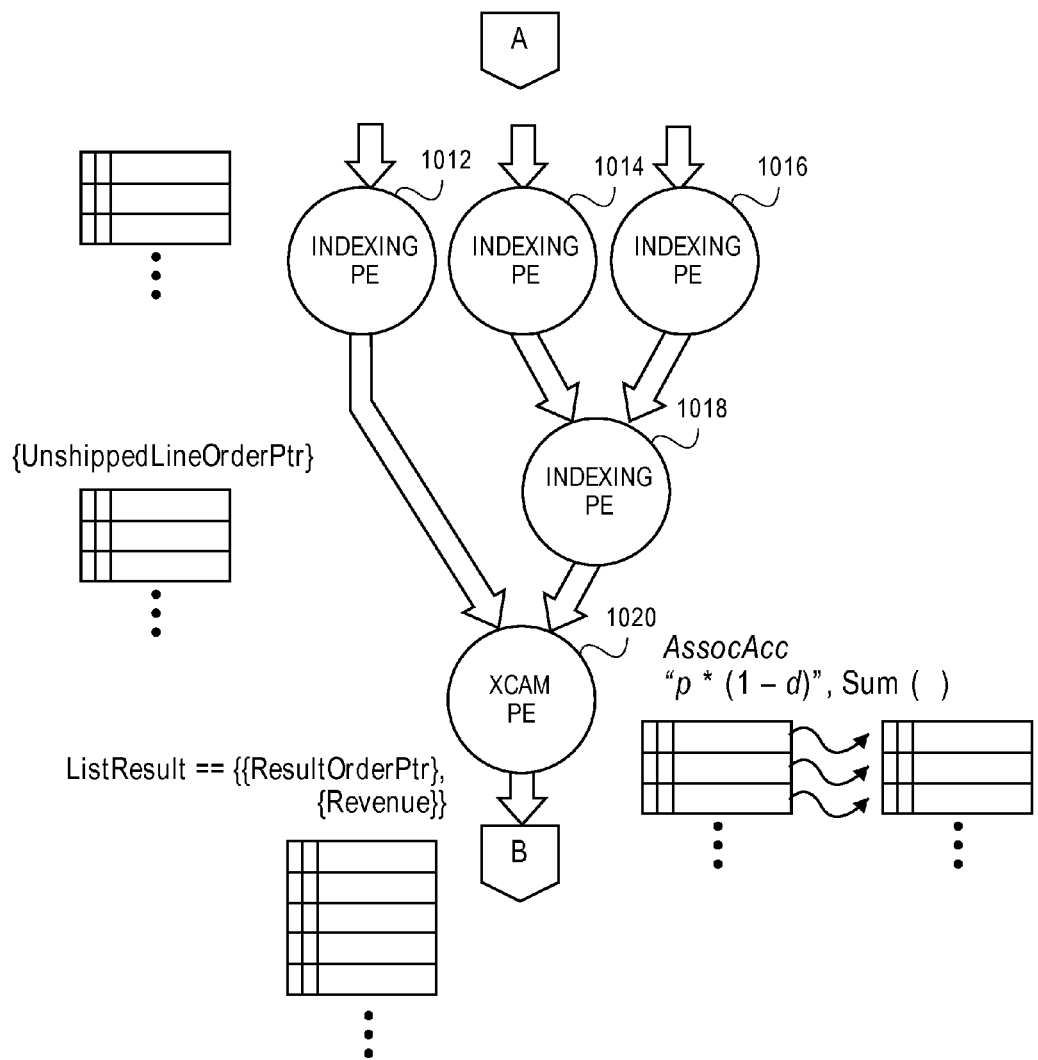
Figure 10:
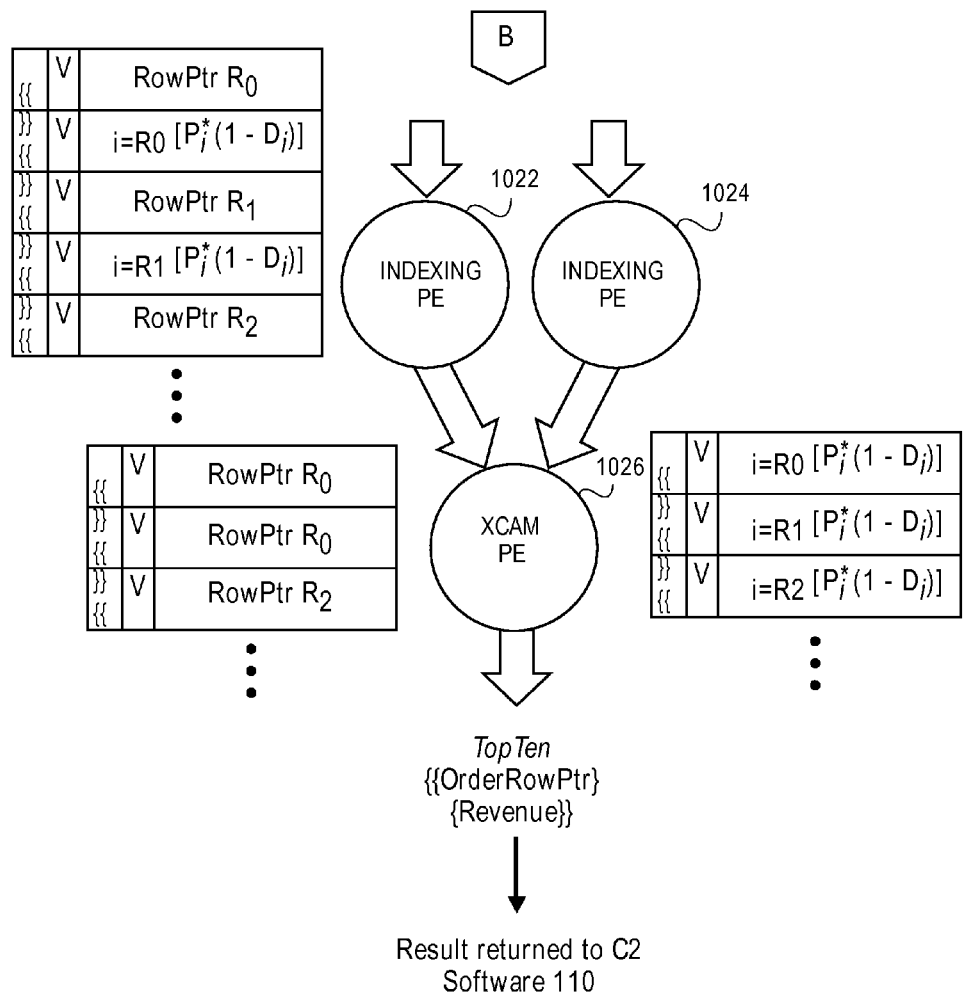
Figure 11:
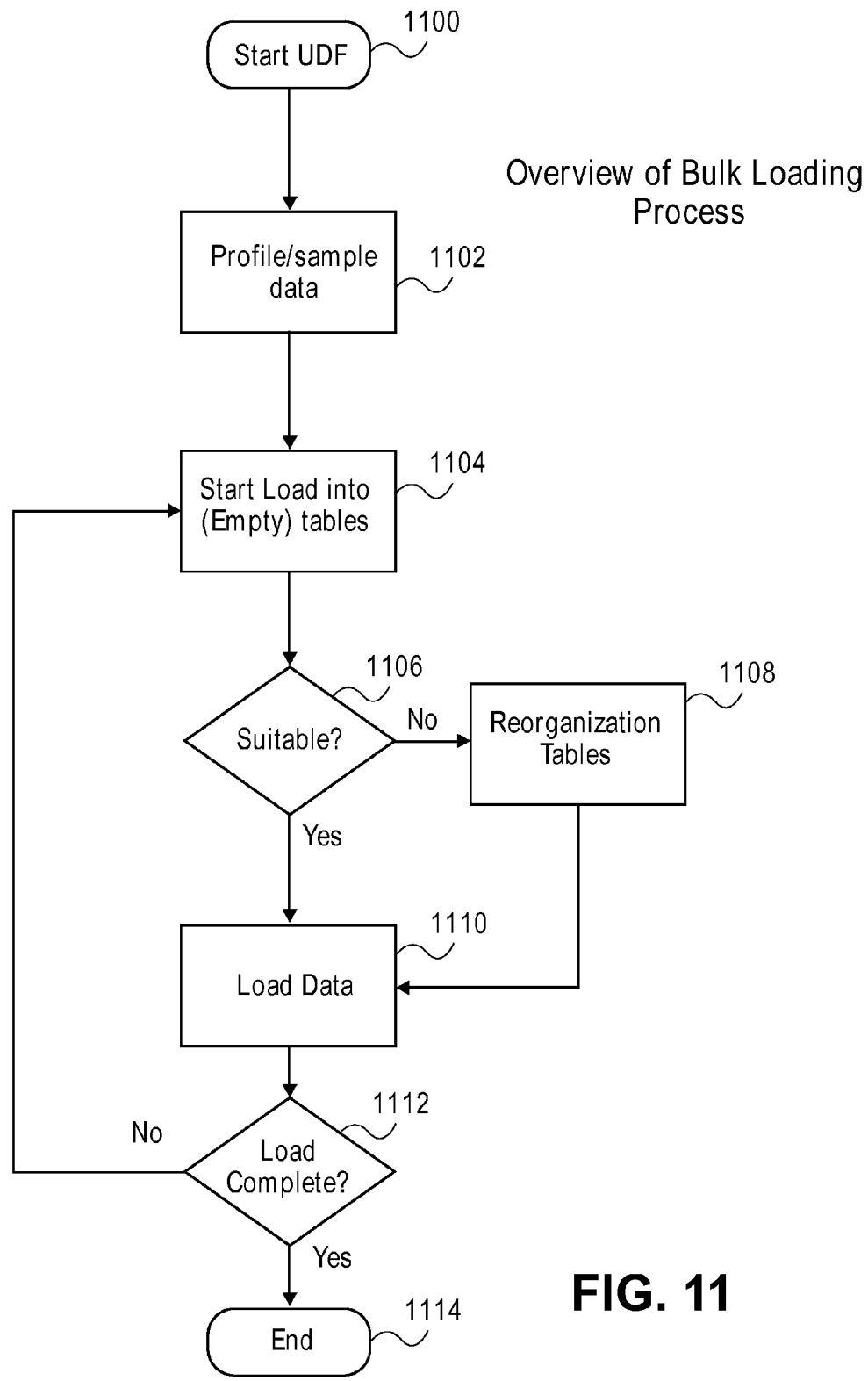
FIGS. 11 and 12 illustrate an exemplary batch loading process.
Figure 12:
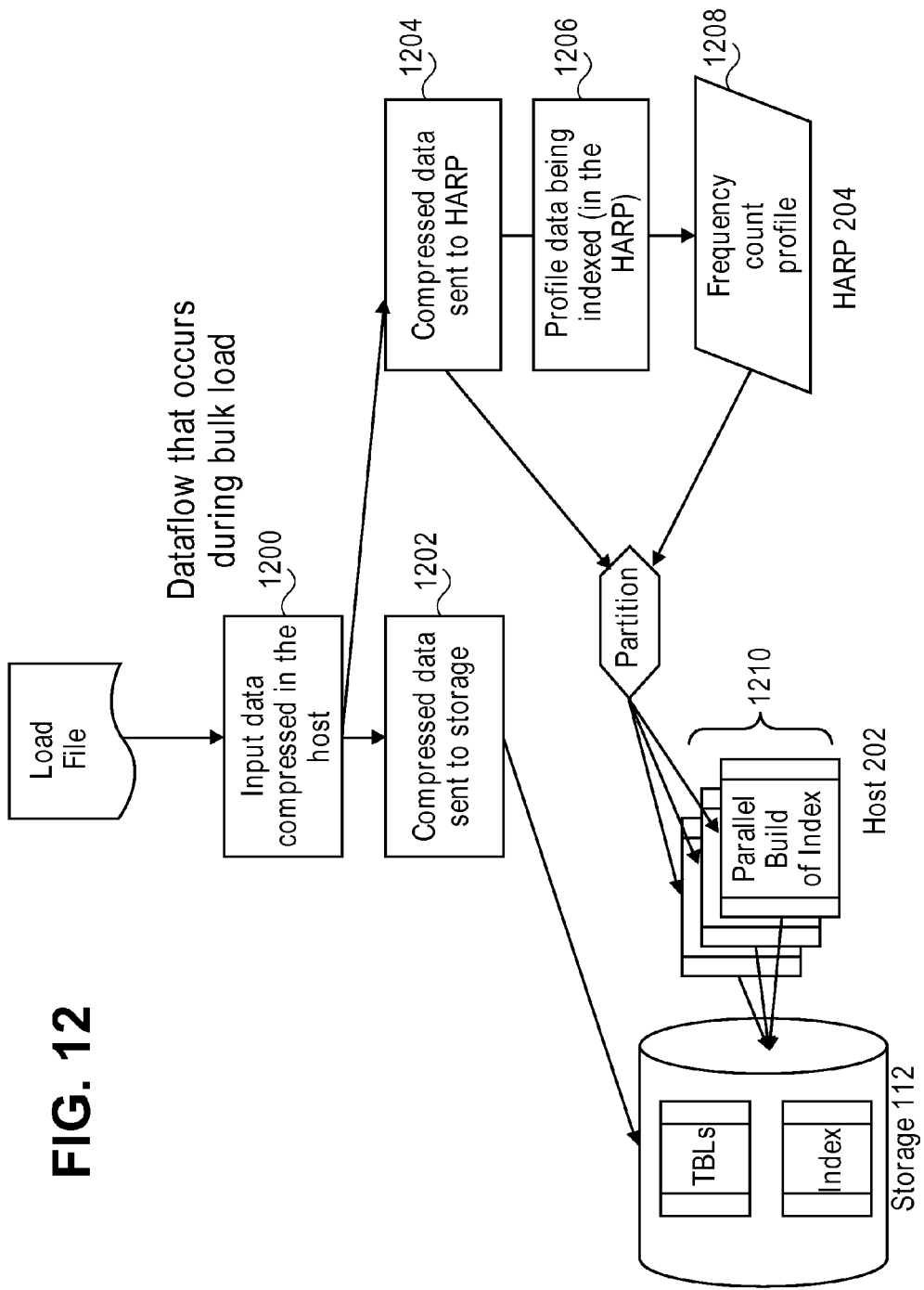
Figure 13:
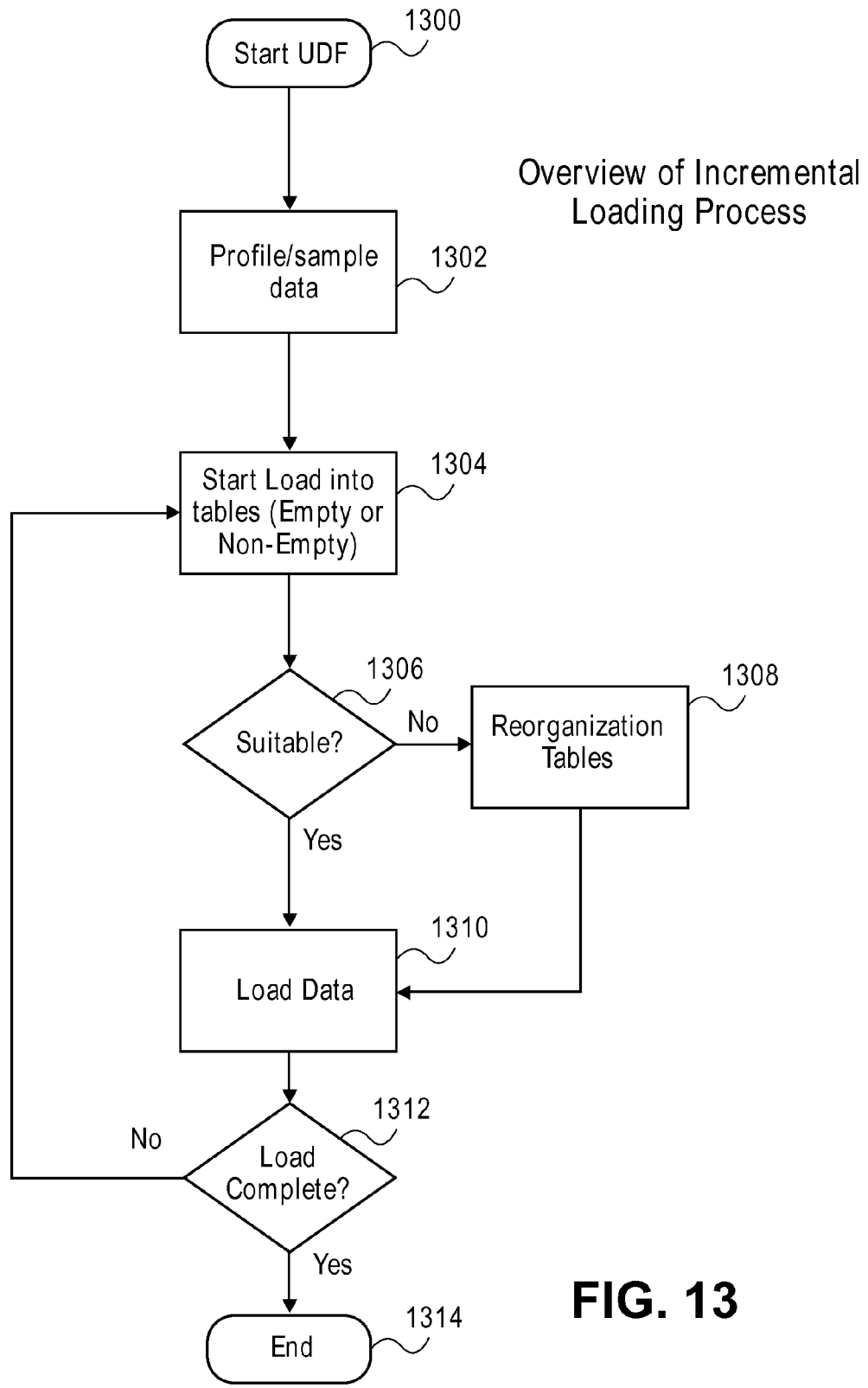
FIGS. 13 and 14 illustrate an exemplary incremental loading process.
Figure 14:
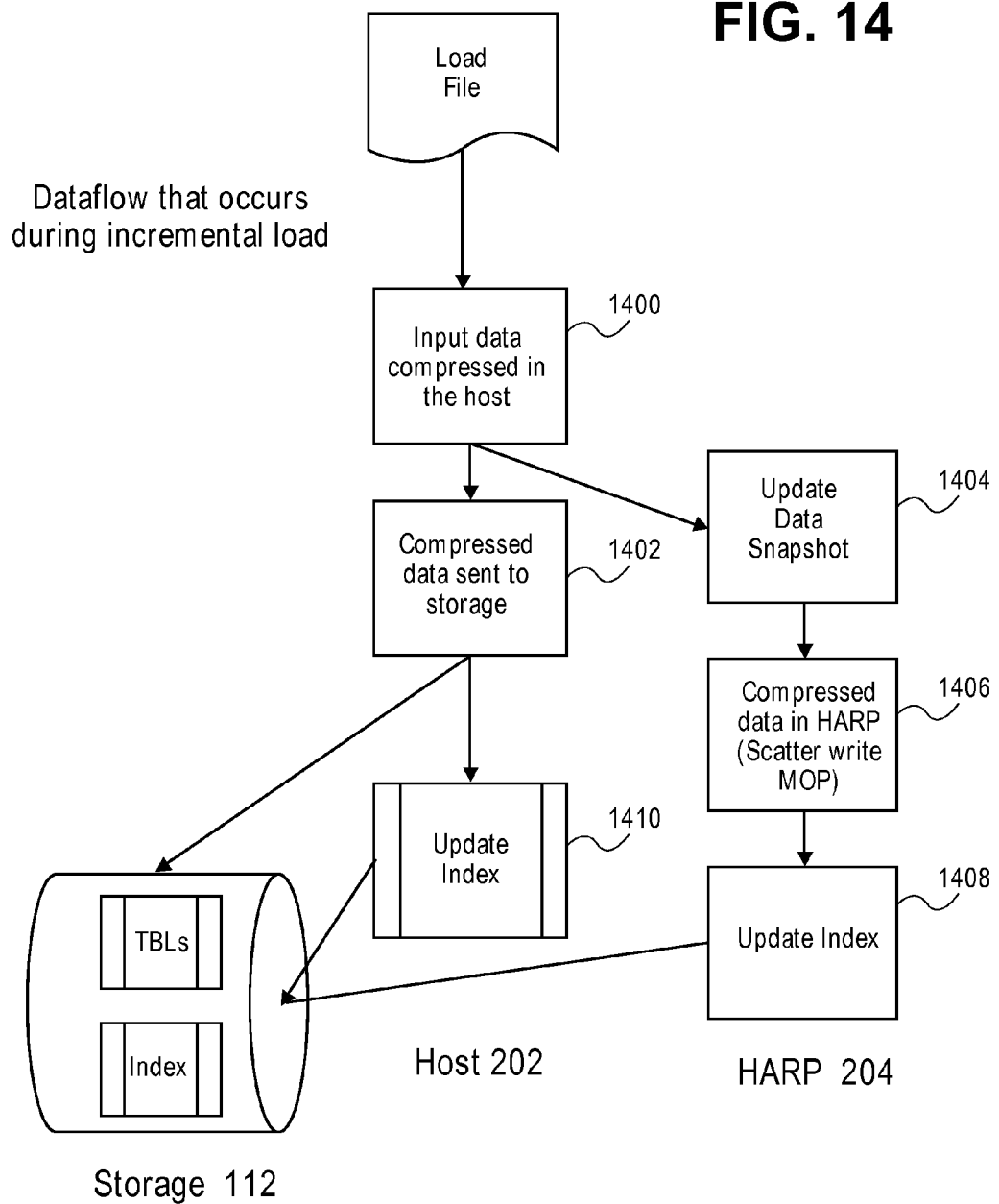
Figure 15:
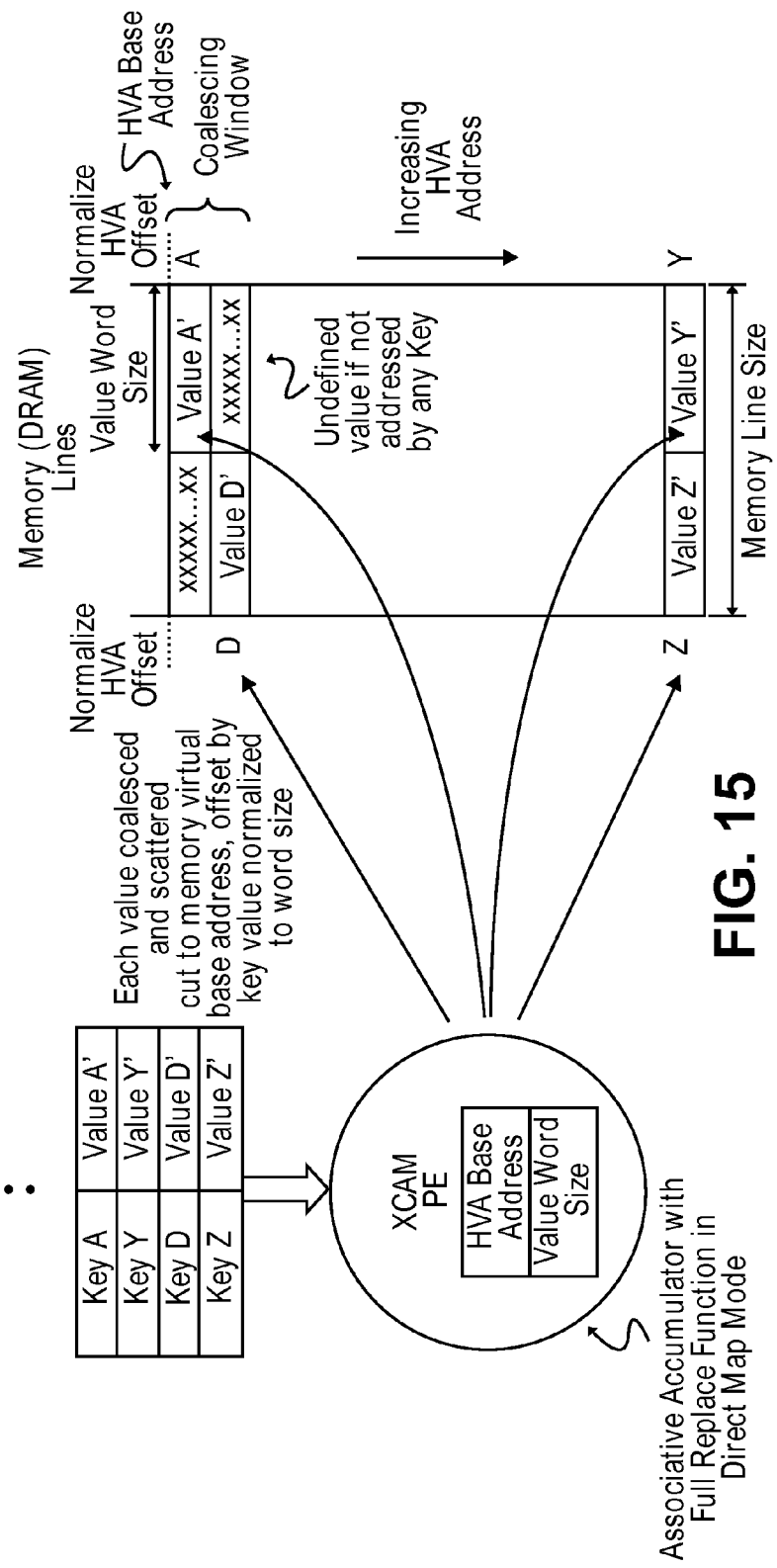
FIGS. 15 and 16 illustrate associative accumulation machine code database instructions for full or selective replacement of data in a table that may be employed as part of bulk or incremental loading.
Figure 16:
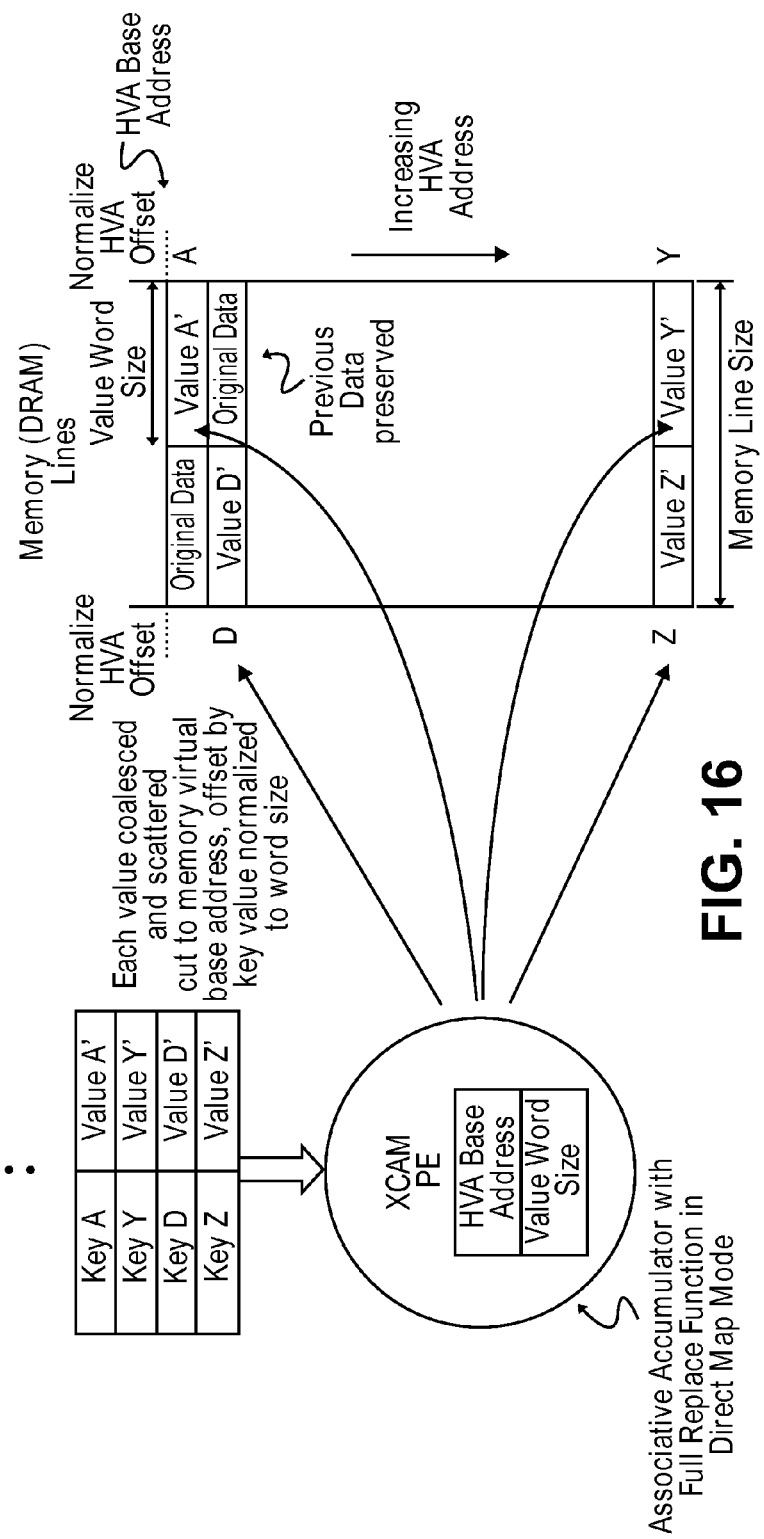

Due to the comprehensive nature of the present inventions in the C2 solution, the figures are presented generally from a high level of detail and progress to a low level of detail. For example, FIGS. 1-3 illustrate exemplary systems and topologies enabled by the present invention. FIG. 4-5 illustrate the architecture of the C2 software. FIG. 6 illustrates the architecture of a HARP module. FIGS. 7-8 illustrate the database format and data structures employed by the C2 solution of the present invention. FIGS. 9-10 illustrates an example execution of a SQL query by the C2 solution of the present invention. FIGS. 11 and 12 illustrate an exemplary batch loading process. FIGS. 13 and 14 illustrate an exemplary incremental loading process. And, FIGS. 15 and 16 illustrate associative accumulation machine code database instructions for full or selective replacement of data in a table that may be employed as part of bulk or incremental loading.

Reference will now be made in detail to the exemplary embodiments of the invention, which are illustrated in the accompanying drawings. Wherever possible, the same reference numbers will be used throughout the drawings to refer to the same or like parts.

FIG. 1

An Exemplary C2 System

The present invention employs a custom computing (C2) solution that provides a significant gain in performance for enterprise database applications. In the C2 solution, a node or appliance may comprise the host (or base) system that is combined with hardware acceleration reconfigurable processors (HARP). These HARPs are specially designed to optimize the performance of database systems and its applications, especially relational database systems and read-intensive applications.

A host system may be any standard or pre-existing DBMS system. In general, such systems will comprise a standard general purpose CPU, a system memory, I/O interfaces, etc.

The HARPs are coupled to the host system and are designed to offload repetitive database operations from the DBMS running on the host system. The HARPs utilize dataflow architecture processing elements that execute machine code instructions that are defined for various database operations. The C2 solution may employ a node that is scalable to include one HARP, or multiple HARPs. In addition, the C2 solution may use a federated architecture comprising multiple nodes, i.e., multiple DBMS servers that are enhanced with the C2 solution.

In some embodiments, the C2 solution employs an open architecture and co-processor approach so that the C2 hardware can be easily integrated into existing database systems. Of note, the hardware acceleration of the C2 solution utilizes novel machine code database instructions to execute certain fragments of a query in a dataflow and using parallel, pipelined execution.

In the present invention, the C2 solution also comprises software that orchestrates the operations of the DBMS running on the host system and the HARPs. The C2 software is configured with a flexible, layered architecture to make it hardware and database system agnostic. Thus, the C2 software is capable of seamlessly working with existing DBMSs based on this open architecture.

In general, the C2 software receives the query from the DBMS and breaks the query down into query fragments. The C2 software then decides which of these query fragments can be appropriately handled in software (in the C2 software itself or back in the originating DBMS) or, ideally, with hardware acceleration in the HARPs. All or part of the query may be processed by the C2 software and HARPs.

In addition, in order to maximize the efficiency of the hardware acceleration, the C2 solution stores its databases in compressed, column-store format and utilizes various hardware-friendly data structures. The C2 solution may employ various compression techniques to minimize or reduce the storage footprint of its databases. The column-store format and hardware-friendly data structures allow the HARPs or C2 software to operate directly on the compressed data in the column-store database. The column-store database may employ columns and column groups that are arranged based on an implicit row identifier (RID) scheme and RID to primary column to allow for easy processing by the HARPs. The hardware-friendly data structures also allow for efficient indexing, data manipulation, etc. by the HARPs.

For example, the C2 solution utilizes a global virtual address space for the entire database to greatly simplify and maximize efficiency of create, read, update, and delete operations of data in a database. In some embodiments, the columns and column groups are configured with a fixed width to allow for arithmetic memory addressing and translation from a virtual address to a physical memory address. On-demand and speculative prefetching may also be utilized by the C2 solution to hide I/O bandwidth latency and maximize HARP utilization.

Referring now to FIG. 1, an exemplary system 100 of the C2 solution is illustrated. As shown, system 100 may comprise an application 102 that is running on a client 104, such as a personal computer or other system. Application 102 interfaces a DBMS 106 across a network 108, such as the Internet, local area network, etc. DBMS 106 may further interface one or more databases stored in storage infrastructure 112. For purposes of explanation, DBMS 106 and its components may be collectively referred to in this disclosure as a node of system 100. Although FIG. 1 shows a single node, system 100 may of course comprise multiple nodes. The various components of FIG. 1 will now be further described.

Application 102 may be any computer software that requests the services of DBMS 106. Such applications are well known to those skilled in the art. For example, application 102 may be a web browser in which a user is submitting various search requests. Of course, application 102 may be another system or software that is consuming the services of DBMS 106 and submitting queries to DBMS 106.

Client 104 represents the hardware and software that supports the execution of application 102. Such clients are well known to those skilled in the art. For example, client 104 may be a personal computer or another server.

DBMS 106 is any computer software that manages databases. In general, DBMS 106 controls the organization, storage, management, retrieval of data in a database. As is well known, these types of systems are common for supporting various SQL queries on relational databases (and thus may also be known as a RDBMS). Due to its open architecture, various DBMS systems may be employed by the present invention. Typical examples of DBMSs include Oracle, DB2, Microsoft Access, Microsoft SQL Server, PostgreSQL, and MySQL.

In some embodiments, and for purposes of explanation, DBMS 106 is shown comprising C2 software 110 interfacing MySQL software 114 via an API 116. MySQL software 114 is open source software that is sponsored and provided by MySQL AB and is well known to those skilled in the art. Of course, any DBMS software, such as those noted above, may be employed in the present invention.

C2 software 110 orchestrates the execution of a query forwarded from DBMS 106, and thus, operates in conjunction with MySQL software 114. For example, in the C2 software 110, SQL queries are broken down into query fragments and then routed to the most appropriate resource. A query fragment may be handled in C2 hardware, i.e., HARP module 204. (HARP module 204 is further described with reference to FIG. 2.) The query fragment may also be processed in the C2 software itself, or returned for handling by MySQL software 114.

In general, C2 software 110 utilizes a flexible, layered architecture to make it hardware and database system agnostic. For example, C2 software 110 may operate as a storage engine of MySQL software 114. As is well known, MySQL software 114 may provide an API 116 for storage engines, which C2 software 110 may plug in to. API 116 comprises the software that specifies how the C2 software 110 and MySQL software 114 will interact, how they will request services from each other, such as SQL queries and results.

As a storage engine, C2 software 110 may employ the MySQL API 116 to provide various storage mechanisms, indexing facilities, locking levels, and ultimately provide a range of different functions and capabilities that are transparent to MySQL software 114. As noted above, this is one aspect of how the present invention overcomes the generic approach in known solutions without having to sacrifice performance for functionality, or fine tune the database. Of note, although FIG. 1 shows a single storage engine, MySQL software 114 may be coupled to multiple storage engines (not shown) in addition to C2 software 110. C2 software 110 is also described in further detail with reference to FIGS. 4-5.

Network 108 represents the communication infrastructure that couples application 102 and DBMS 106. For example, network 108 may be the Internet. Of course, any network, such as a local area network, wide area network, etc., may be employed by the present invention.

Storage infrastructure 112 comprises the computer storage devices, such as disk arrays, tape libraries, and optical drives that serve as the storage for the databases of system 100. Storage infrastructure 112 may employ various architectures, such as a storage area network, network attached storage, etc., which are known to those skilled in the art.

In some embodiments, the C2 solution stores its databases in storage infrastructure 112 in column-store format. Column-store format is where data is stored in columns or groups of columns. Column-store format is advantageous for data fetching, scanning, searching, and data compression. The column-store format may employ fixed width columns and column groups with implicit RIDs and a RID to primary key column to allow for arithmetic memory addressing and translation. This allows HARPs 204 to utilize hardware processing for database processing, such as column hopping, and to operate directly on the compressed data in the columns.

In contrast, in typical DBMS environments, data is stored in row-store format. Row-store format is sometimes considered by those skilled in the art for having better performance in data updates and record retrieval; thus, it is sometimes considered to have better functionality over column-store databases in most applications with a high ratio of updates over reads. In the present invention, however, the C2 solution achieves better performance by using hardware acceleration with a column-store database, yet it still delivers the functionality and benefits of row-store databases. The column store format used by the C2 solution of the present invention is further described with reference to FIGS. 7-8.

FIG. 2

System Topologies

FIG. 2 illustrates exemplary system topologies that are consistent with the principles of the present invention. As shown, FIG. 2 illustrates a basic C2 node topology, a scale up C2 node topology, and a scale out topology. These various topologies may be utilized to customize the C2 solution for various sizes of databases and desired performance. In addition, these topologies are provided to illustrate that the C2 solution can be easily scaled up to virtually any size of database or performance.

First, the basic C2 node will be explained, which comprises a single host system 202 and a single HARP module 204. Variations of this basic node will then be explained to show how the basic node can be scaled up and how multiple nodes can be employed in a federated architecture.

The basic C2 node topology may comprise a host system 202 and a hardware acceleration reconfigurable processor (HARP) module 204. Collectively, host 202 and HARP module 204 may be referred to as a node or appliance. In some embodiments, host system 202 and HARP module 204 are coupled together over a known communications interface, such as a PCIe or hypertransport (HT) interface. In terms of packaging, host system 202 and HARP module 204 may be built on one or more cards or blades that are bundled together in a common chassis or merely wired together. In the C2 solution, host system 202 and HARP module 204 may be flexibly packaged using a modular form factor for ease of installation and scaling.

The host system 202 may comprise a general purpose CPU, such as a Xeon x86 processor by the Intel Corporation, and a memory, such as a dynamic random access memory. Such types of host systems are well known to those skilled in the art. In general, in the C2 solution, host system 202 will be used to process parts of a query that are less time consuming (i.e., slow path portion), such as server-client connection, authentication, SQL parsing, logging, etc. However, in order to optimize performance, the batch of query execution (i.e., the fast path portion) is offloaded to the HARP module 204.

Host system 202 may run MySQL software 114 and also run C2 software 110 that orchestrates query processing between MySQL 114 and HARP 204. In particular, C2 software 110 will decompose a query into a set of query fragments. Each fragment comprises various tasks, which may have certain dependencies. C2 software 110 will determine which fragments and tasks are part of the fast path portion and offload them to the HARP module 204. Appropriate tasks for the selected query fragments are sent to HARP module 204 with information on the database operation dependency graph. Within the HARP module 204, tasks are further broken down into parallel/pipelined machine code operations (known as MOPs) and executed in hardware.

HARP module 204 comprises processing logic (HARP logic 302) and a relatively large memory (HARP memory 304) for hardware accelerating database operations of the node. In some embodiments, HARP module 204 is configured to handle various repetitive database tasks, such as table scanning, indexing, etc. In the C2 solution, HARP module 204 can receive high-level database query tasks (not just low-level read/write or primitive computation tasks as is typically for a general purpose processor) in the form of machine code database instructions.

HARP logic 302 is the hardware that executes machine code database instructions for the database tasks being handled by HARP module 204. To adapt to application requirement changes, the HARP logic 302 is designed to have hardware re-configurability. Accordingly, in some embodiments, HARP logic 302 is implemented using field programmable gate arrays (FPGAs). However, any type of custom integrated circuit, such as application specific integrated circuits (ASICs), may be implemented as HARP logic 302.

HARP memory 304 serves as the memory of HARP module 204. In order to maximize the efficiency of the HARP logic 302, the HARP memory 304 may be implemented using relatively large amounts of memory. For example, in some embodiments, the HARP memory 304 in a HARP module 204 may comprise 256 Giga-Bytes or more of RAM or DRAM. Of course, even larger amounts of memory may be installed in HARP module 204. HARP logic 302 and HARP memory 304 are further described with reference to FIG. 6.

In addition to the basic C2 node, a scale up C2 node topology may be used as an extension of the basic C2 node. As shown, host system 202 may now be coupled to a plurality or array of 1-N HARP modules 204. In this type of node, a PCIe switch or other suitable switching fabric may couple these components together with storage infrastructure 112. Of course, other internal arrangements for a scale up C2 node may be utilized in the present invention.

Going further, a scale out topology can be used for multiple C2 nodes. As shown, the scale out topology may comprise various combinations of either the basic or scale up C2 nodes. For example, as shown, the scale out topology may comprise Nodes 1-M, which are coupled to storage infrastructure 112. In FIG. 2, Node 1 is shown as a basic C2 node, while Node M is shown as a scale up node. A control node 206 is also shown and manages the operations of Nodes 1-M. Control node 206 is shown as a separate node; however, those skilled in the art will recognize the role of control node 206 by any of Nodes 1-M. Other variations in node hierarchy and management are within the scope of the present invention. Of course, this topology may also comprise a variety of combinations of nodes.

FIGS. 3A and 3B

Some Advantages of the Present Invention

FIG. 3A illustrates a prior art database system and FIG. 3B illustrates an exemplary implementation of the C2 solution for the present invention. In FIG. 3A, a typical prior art database system is shown. An SQL query is submitted to a DBMS (e.g., MySQL), which runs on top of a typical operating system. The CPU attempts to then execute the SQL query. However, because the CPU is a general purpose CPU it executes this query based on software, which has several limitations.

In contrast, as shown in FIG. 3B, the SQL query may submitted to a C2 system having a DBMS that comprises a top layer DBMS software (i.e., MySQL) 114 and C2 software 110. C2 software 110 interfaces with the DBMS software 114 to orchestrate and optimize processing of the SQL query.

In particular, C2 software 110 may identify portions of the query, i.e., the fast path portion, which is better handled in hardware, such as HARP module 204. Such portions may be those fragments of the query that are repetitive in nature, such as scanning, indexing, etc. In the prior art system, the DBMS is limited by its own programming, the operating system, and the general purpose CPU. The present invention avoids these bottlenecks by offloading fast path portions of a query to HARP module 204.

As shown, HARP module 204 comprises HARP logic 302 and a HARP memory 304 to accelerate the processing of SQL queries. In order maximize the use of HARP module 204, the present invention may also utilize column store databases. Whereas the prior art system is hindered by the limitations of a standard row store database. These features also allow the present invention to maximize the performance of the I/O between the operating system and storage.

For ease of implementation, C2 software 110 may be implemented on well known operating systems. The operating system will continue to be used to perform basic tasks such as controlling and allocating memory, prioritizing system requests, controlling input and output devices, facilitating networking, and managing files and data in storage infrastructure 112. In some embodiments, various operating systems, such as Linux, UNIX, and Microsoft Windows, may be implemented.

FIGS. 3A and 3B are provided to illustrate some of the differences between the present invention and the prior art and advantages of the present invention. Those skilled in the art will also recognize that other advantages and benefits may be achieved by the embodiments of the present invention. For purposes of explanation, the present disclosure will now describe the C2 software, hardware, data structures, and some operations in further detail.

FIG. 4

C2 Software Architecture

As noted, C2 software 110 orchestrates the processing a query between MySQL software 114 and HARP module 204. In some embodiments, C2 software 110 runs as an application on host system 202 and as a storage engine of MySQL software 114. FIG. 4 illustrates an architecture of the C2 software 110. As shown, C2 software 110 comprises a query and plan manager 402, a query reduction/rewrite module 404, an optimizer 406, a post optimizer module 408, a query plan generator 410, an execution engine 412, a buffer manager 414, a task manager 416, a memory manager 418, a storage manager 420, an answer manager 422, an update manager 424, shared utilities 426, and a HARP manager 428. Each of these components will now be briefly described.

Query and plan manager 402 analyzes and represents the query received from the MySQL software 114, annotates the query, and provides a representation of the query plan. Query reduction/rewrite module 404 breaks the query into query fragments and rewrites the query fragments into tasks. Rewrites may be needed for compressed domain rewrites and machine code database instruction operator rewrites. Optimizer 406 performs cost-based optimization to be done using cost model of resources available to C2 software 110, i.e., HARP module 204, resources of C2 software 110 itself using software operations, or MySQL software 114.

These modules interact with each other to determine how to execute a query, such as a SQL query from MySQL software 114. The data structures output by the query plan generator 410 will be the same data structure that the optimizer 406 and the rewrite module 404 will operate on. Once a parsed SQL query has been represented in this data structure (converted, for example, from MySQL), manager 402 rewrites the query such that each fragment of the query can be done entirely in MySQL software 114, in C2 software 110, or in HARP module 204. Once the final query representation is available, the rewrite module 404 goes through and breaks the graph into query fragments.

Post optimizer module 408 is an optional component that rewrites after the optimizer 406 for coalescing improvements found by optimizer 406. Query plan generator 410 generates an annotations-based, template-driven plan generation for the query tasks. Execution engine 412 executes the query fragments that are to be handled by software or supervises the query execution in HARP module 204 via HARP manager 428.

Buffer manager 414 manages the buffers of data held in the memory of host 202 and for the software execution tasks handled by host 202. Task manager 416 orchestrates the execution of all the tasks in HARP module 204 and software, i.e., in execution engine 412 or MySQL software 114.

Memory manager 416 manages the virtual address and physical address space employed by C2 software 110 and HARP module 204 in HARP memory 304. In some embodiments, memory manager 416 utilizes a 50 bit VA addressing (i.e., in excess of 1 petabyte). This allows C2 software 110 to globally address an entire database and optimize hardware execution of the query tasks.

Storage manager 420 is responsible for managing transfers of data from HARP memory 304 to/from storage infrastructure 112. Answer manager 422 is responsible for compiling the results of the query fragments and providing the result to MySQL software 114 via the API 116.

Update manager 424 is responsible for updating any data in the database stored in storage infrastructure 112. Shared utilities 426 provide various utilities for the components of C2 software 110. For example, these shared utilities may include a performance monitor, a metadata manager, an exception handler, a compression library, a logging and recovery manager, and a data loader.

HARP manager 428 controls execution of the tasks in HARP module 204 by setting up the machine code database instructions and handles all interrupts from any of the hardware in HARP module 204. In some embodiments, HARP manager 428 employs a function library known as a Hardware Acceleration Function Library (HAFL) in order to make its function calls to HARP module 204.

FIG. 5

Protocol Stack of C2 Software

As shown, a SQL query is received in the RDBMS layer, i.e., MySQL software 114. MySQL software 114 then passes the SQL query via API 116 to C2 software 110. In C2 software 110, the SQL query is processed and executed. At this layer, C2 software 110 also manages retrieving data for the SQL query, if necessary, from storage infrastructure 112 or from host system 202.

In order to communicate with HARP module 204, HARP manager 428 employs the HAFL layer in order to make its function calls to HARP module 204. In order to allow for variances in hardware that may exist in HARP module 204, the protocol stack may also comprise a hardware abstraction layer. Information is then passed from C2 software 110 to HARP module 204 in the form of machine code database instructions via an interconnect layer. As noted, this interconnect layer may be in accordance with the well known PCIe or HT standards.

Within HARP module 204, the machine code database instructions are parsed and forwarded to HARP logic 302. These instructions may relate to a variety of tasks and operations. For example, as shown, the protocol stack provides for systems management, task coordination, and direct memory access to HARP memory 304. In HARP logic 302, machine code database instructions are interpreted for the various types of processing elements (PE). HARP logic 302 may interface with HARP memory 304, i.e., direct memory access by utilizing the memory management layer.

FIG. 6

HARP Logic

FIG. 6 illustrates an exemplary architecture of the HARP logic 302. As shown, HARP logic 302 may comprise a set of processing cores 602, 604, 606, and 608, and switching fabric 610. Processing core 602 (as well as cores 604, 606, and 608) may comprise a set of processing elements (PEs) 620. In the embodiment shown, processing cores 602, 604, 606, and 608 each comprise two PEs; of course, each processing core may comprise any number of PEs.

In addition to its PEs, processing core 602 may comprise a task processor 612, a memory manager 614, a buffer cache 616, and an interconnect 618. One or more these components may be duplicated or removed from the other processing cores 604, 606, and 608. For example, as shown, core 602 may be the sole core that includes task processor 612 and an interconnect 618. This architecture may be employed because cores 602, 604, 606, and 608 are connected via switching fabric 610 and may operate logically as a single processor or processor core. Of course, one skilled in the art will recognize that various redundancies may be employed in these processing cores as desired.

Task processor 612 is the hardware that supervises the operations of the processing cores 602, 604, 606, and 608. Task Processor 612 is a master scheduling and control processing element, disconnected from the direct dataflow of the execution process for a query. Task processor 612 maintains a running schedule of machine code database instructions which have completed, are in progress, or are yet to execute, and their accompanying dependencies, the Task Processor 612 may also dispatch machine code database instructions for execution and monitor their progress. Dependencies can be implicit, or explicit in terms of strong intra- or inter-processor release criteria. Machine code database instructions stalled for software-assist can be context-switched by the Task Processor 612, which can begin or continue execution of other independent query tasks, to optimize utilization of execution resources in HARP logic 302.

Memory manager 614 is the hardware that interfaces HARP memory 304. For example, memory manager 614 may employ well known memory addressing techniques, such as translation look-aside buffers to map the global database virtual address space to a physical address in HARP memory 304 to access data stored in HARP memory 304.

Buffer cache 616 serves as a small cache for a processing core. For example, temporary results or other meta-data may be held in buffer cache 616.

PCIe interconnect 618 is the hardware that interfaces with host system 202. As noted, interconnect 618 may be a PCIe or HT interconnect.

PEs 620 represent units of the hardware and circuitry of HARP logic 302. As noted, PEs 620 utilize a novel dataflow architecture to accomplish the query processing requested of HARP logic 302. In particular, PEs 620 implement execution of an assortment of machine code database instructions that are known as Macro Ops (MOPs) and Micro Ops (UOPs). MOPs and UOPs are programmed and executed by the PEs 620 to realize some distinct phase of data processing needed to complete a query. MOPs and UOPs are just example embodiments of machine code database instructions; other types of instruction sets for high level database operations of course may be used by the C2 solution.

PEs 620 pass logical intermediate MOP results among one another through a variable-length dataflow of dataflow tokens, carried across an interconnect data structure (which is a physical data structure and not a software data structure) termed an Inter-Macro Op Communication (IMC) path. Of note, the IMC paths and self routing fabric 610 allow HARP module 204 to utilize a minimal amount of reads/writes to HARP memory 304 by keeping most intermediate results flowing through the IMCs in a pipelined, parallel fashion. IMC may be temporarily stored in buffer caches 616 and interconnect fabric 610; however, IMCs can also be dispatched out through interconnect 618 to other PEs 620 on another HARP module.

In the dataflow concept, each execution step, as implemented by a MOP and its accompanying UOP program, can apply symmetrically and independently to a prescribed tuple of input data to produce some tuple of result. Given the independence and symmetry, any number of these tuples may then be combined into a list, matrix, or more sophisticated structure to be propagated and executed in pipelined fashion, for optimal execution system throughput. These lists of tuples, comprised fundamentally of dataflow tokens, are the intermediate and final results passed dynamically among the MOPs via IMC.

Although the dataflow travels over physical links of potentially fixed dimension, the logical structure of the contents can be multi-dimensional, produced and interpreted in one of two different ways: either with or without inherent, internal formatting information. Carrying explicit internal formatting information allows compression of otherwise extensive join relationships into nested sub list structures which can require less link bandwidth from fabric 610 and intermediate storage in buffer cache 616, at the cost of the extra formatting delimiters, increased interpretation complexity and the restriction of fixing the interpretation globally among all consumers.

Without inherent formatting, a logical dataflow may be interpreted by the consumer as any n-dimensional structure having an arbitrary but consistent number of columns of arbitrary but consistent length and width. It should be noted that the non-formatted form can be beneficial not only in its structural simplicity, but in the freedom with which consumer MOPs may interpret, or reinterpret, its contents depending upon the purpose of the execution step a consumer is implementing.

The dataflow used in realizing a given query execution can be described by a directed acyclic graph (DAG) with one intervening MOP at each point of flow convergence and bifurcation, one MOP at each starting and ending point, as well as any point necessary in between (i.e. single input & output MOP). The DAG must have at least one starting and one ending point, although any larger number may be necessary to realize a query. MOPs which serve as the starting point are designed to begin the dataflow by consuming and processing large amounts of data from local storage. Ending point MOPs may terminate the dataflow back into local storage, or to a link which deposits the collected dataflow (result table list) into host CPU memory. An example of a DAG for a well known TPC-H query is shown in FIG. 9.

As mentioned above, MOP DAGs can physically and logically converge or bifurcate, programmatically. The physical convergence is accomplished with a multi-input MOPs which relate inputs in some logical fashion to produce an output comprised of all inputs (e.g. composition, merge, etc.). The physical bifurcation is accomplished by means of multicast technology in the IMC fabric, which dynamically copies an intermediate result list to multiple consumer MOPs. These mechanisms work together to allow realization of any desired DAG of MOP execution flow.

In the present invention, each MOP is configured to operate directly on the compressed data in the column-store database and realizes some fundamental step in query processing. MOPs are physically implemented and executed by PEs 620 which, depending on specific type, will realize a distinct subset of all MOP types. MOPs work systematically on individual tuples extracted either from local database storage in HARP memory 304 or the IMC dataflow, producing output tuples which may be interpreted by one or more MOP processes downstream.

UOPs are the low-level data manipulators which may be combined into a MOP-specific UOP program accompanying a MOP, to perform analysis and/or transformation of each tuple the MOP extracts. MOPs which utilize UOP programs are aware of the dependency, distributing selected portions of each tuple to the underlying UOP engine, extant within all PEs 620 supporting such MOPs. For each set of inputs from each tuple, the UOP program produces a set of outputs, which the MOP may use in various ways to realize its function.

For example, one manner a MOP may use UOP output is to evaluate each tuple of a list of tuples for a set of predicating conditions, where the MOP decides either to retain or to drop each tuple based on the UOP result. Another manner is for the UOP to perform an arithmetic transformation of each input tuple, where the MOP either appends the UOP result to form a larger logical tuple, or replaces some portion of the input tuple to form the output tuple.

Given a finite number of execution resources in PEs 620, the full MOP dataflow DAG needed to execute a query may be partitioned into segments of connected MOPs called tasks. These tasks are then scheduled by task processor 612 for execution in a sequential fashion, as MOP execution resources become available in PEs 620. Significant in this process is the propagation of the execution dataflow among these tasks, such that the entire query result is accurately and consistently computed, regardless of how each task is apportioned and regardless of the latency between scheduling each task.

One method that may be employed in HARP logic 302 is to treat each task atomically and independently, terminating the dataflow back into local storage in HARP memory 304 at the end of each task and restarting that dataflow at the beginning of the subsequent task by reloading it from HARP memory 304. In some embodiments, a more efficient method may be employed to pipeline tasks at their finer, constituent MOP granularity, where at least one MOP of a new task may begin execution before all MOPs of the previous task have finished. This fine-grained method is referred to as Task Pipelining.

Keeping the dataflow alive over task boundaries is a key to realizing the extra efficiency of Task Pipelining. To accomplish this in the C2 solution, IMCs may include the ability to dynamically spill, or send their dataflow to an elastic buffer backed by HARP memory 304, pending the awakening of a consumer MOP which will continue the dataflow. On scheduling the consumer MOP, IMCs are able to fill dynamically, reading from the elastic buffer in HARP memory 304 as necessary to continue execution, pulling out any slack that may have built up in the dataflow while waiting for the scheduling opportunity. Task Pipelining with these mechanisms then may provide a more efficient use of execution resources, down to the MOP granularity, such that a query may be processed as quickly as possible.

High-latency, low-bandwidth, non-volatile storage in storage infrastructure 112 often holds the contents of a query, due to the sheer volume of data involved. Because execution rates can outstrip the bandwidth available to read from such storage, tasks requiring latent data can shorten execution time by starting and progressing their dataflow execution at the rate the data arrives, instead of waiting for an entire prefetch to complete before beginning execution. This shortcut is referred to as Prefetch Pipelining. The C2 solution may employ both on-demand prefetching and speculative prefetching. On-demand prefetching is where data is prefetched based on the progress of the dataflow. Speculative prefetching is where data is prefetched based on an algorithm or heuristic that estimates the data is likely to be requested as part of a dataflow.

In the present invention, realizing Prefetch Pipelining is accomplished by having one or more MOPs beginning a task's dataflow are capable of accepting data progressively as it is read from slow storage in storage infrastructure 112. IMCs are capable of filling progressively as data arrives, as are all MOPs already designed to read from local storage in HARP memory 304. Given that support, MOPs can satisfy the requirement of executing progressively at the rate of the inbound dataflow and accomplish efficient Prefetch Pipelining.

As shown, processing core 602 may comprise scanning/indexing PE 622 and XCAM PE 624 as its set of PEs 620. As noted, PEs 620 are the physical entities responsible for executing MOPs, with their underlying UOPs, and for realizing other sophisticated control mechanisms. Various incarnations of processing elements are described herein, where each incarnation supports a distinct subset of the MOP and control space, providing different and distinct functionality from the perspective of query execution. Each of the different PE forms is now addressed where those which support MOPs employing UOP programs implicitly contain a UOP processing engine.

Scanning/Indexing PE 622 implements MOPs which analyze database column groups stored in local memory, performing parallel field extraction and comparison, to generate row pointers (row ids or RIDs) referencing those rows whose value(s) satisfy the applied predicate. For some MOP forms, a metadata Value List (which is an abstract term for a logical tuple list flowing through an IMC) containing a column of potentially sparse row pointers may be given as input, in which case the scan occurs over a sparse subset of the database. For other forms, scanning occurs sequentially over a selected range of rows.

The selection predicate is stipulated through a micro-op (UOP) program of finite length and complexity. For conjunctive predicates which span columns in different column groups, scanning may be done either iteratively or concurrently in dataflow progression through multiple MOPs to produce the final, fully selected row pointer list.

Inasmuch as the Scanning/Indexing PE 622 optimizes scanning parallelism and is capable of constructing and interpreting compacted what are known as bitmap bundles of row pointers (which are a compressed representation of row pointers, sparse or dense, that can be packed into logical tuples flowing through an IMC), it operates most efficiently for highly selective predicates, amplifying the benefits thereof. Regardless, its MOP support locates specific database content.

Scanning/Indexing PE 622 also implements MOPs which project database column groups from HARP memory 304, search and join index structures, and manipulate in-flight metadata flows, composing, merging, reducing, and modifying multi-dimensional lists of intermediate and final results. Depending on the MOP, input is one or more Value Lists whose content may be interpreted in a one- or two-dimensional manner, where two-dimensional lists may have an arbitrary number of columns (which may have arbitrary logical width).

In the context of list reduction, a UOP program of finite length and complexity is stipulated as a predicate function, to qualify one or more components of the input Value List elements, eliminating tuples which do not qualify. List composition involves the combining of related lists into a single output format which explicitly relates the input elements by list locality, while list merging involves intermingling input tuples of like size in an unrelated order. Modification of lists involves a UOP which can generate data-dependent computations, to replace component(s) of each input tuple.

The Scanning/Indexing PE 622 may also be used for joins with indexes, like a Group Index, which involves the association of each input tuple with potentially many related data components, in a one-to-many mapping, as given by referencing the index via a row pointer component contained in each input tuple. MOPs implemented by the Scanning/Indexing PE 622 may thus relate elements of a relational database in by query-specific criteria, which is useful for any query of moderate to advanced complexity.

XCAM PE 624 implements MOPs which perform associative operations, like accumulation and aggregation, sieving, sorting and associative joins. Input is in the form of a two-dimensional metadata Value List which can be interpreted as containing at least two columns related by list locality: key and associated value.

Accumulation occurs over all data of like keys (associatively), applying one of several possible aggregation functions, like Summation or an atomic compare and exchange of the current accumulator value with the input value component. A direct map mode exists which maps the keys directly into HARP memory 304, employing a small cache (not shown) to minimize memory access penalties. A local mode of accumulation exists, as well, to realize zero memory access penalties by opportunistically employing the cache, at the risk of incomplete aggregation.

Sieving involves the progressive capture of keys qualifying as most extreme, according to a programmable sieving function, generating a result list of the original input keys and values such that the last N tuples' keys are the most extreme of all keys in the original input. Iterative application of Sieve can converge on a sorted output, over groups of some small granularity.

Sorting can also be accomplished through construction and traversal of either hashes or B-Trees, which are constructed to relate each input key to its associated value with a structure that is efficient to search and join with.

Within each of PEs 620 thus may be a UOP Processing Engine (not shown). Whereas PEs 620 execute MOPs in a dataflow fashion at the higher levels, embedded UOP Processing Engines in PEs 620 realize the execution of UOPs, which embed within their logical MOP parent to serve its low-level data manipulation and analysis needs. In some embodiments, the UOP processing engine is code-flow logic, where a UOP program is executed repetitively by a parent Processing Element at MOP-imposed boundaries, given MOP-extracted input data, to produce results interpreted by the parent MOP.

Considering the code-flow nature, each UOP engine has its own program storage, persistent register set and execution resources. It is capable, through appropriate UOP instructions, to accept data selected from the parent MOP and to simultaneously execute specified data manipulation or analysis thereon, in combination with some stored register state. In this manner, this tiny code-flow processor is able to fit seamlessly into the dataflow as a variable-latency element which, at the cost of increased latency, is capable of performing any of the most complex low-level data manipulation and analysis functions on the dataflow pouring through. The capability of the MOP to select and present only those data required for UOP processing, at a fine granularity, minimizes the latency imposed by the UOP code flow, maximizing overall dataflow throughput.

FIG. 7

C2 Data Structures

The C2 solution utilizes various hardware-friendly data structures to assist in hardware accelerating database operations by HARP modules 204. As described below in [0111] Table 1, the C2 solution may employ three different columns. These columns enable efficient utilization of HARP logic 302 and HARP memory 304, and bandwidth and disk bandwidth with storage infrastructure 112.

TABLE 1

Column Formats

| Name | Description |
| --- | --- |
| Packed Column | All rows in the column are packed consecutively. All rows have a uniform size in each column. A packed column can be disk-resident or memory-resident. The packed Column can be sorted with respect to the primary key. |
| Sorted-Compressed Column | This is for the date columns. The date is stored in the form of running length. Each date has an entry for recording its starting count and ending count. The offset could be zero if the date does not have any item in the table. It companion column can be accessed with staring and ending counts. |

TABLE 1-continued

Column Formats

| Name | Description |
| --- | --- |
| Companion Column | The companion table links the Sorted-Compressed Column to other columns. |

In general, hot columns (i.e., columns having active or frequent access) stay in the HARP memory 304 so that they can be accessed randomly fast. Warm Columns (i.e., columns having less active access) also stay in the HARP memory 304; but occasionally, they may be evicted to a disk in storage infrastructure 112. Cold columns usually be held in storage infrastructure 112, but may be partially brought into HARP memory 304, e.g., for one time usage. In some embodiments, date columns in the Sorted-Compressed format will be held in the memory of host system 202 and accessed by the software running on host 202.

In general, there is a single entry point for HARP module 204 to identify all the database columns. In particular, as shown in FIG. 7, a root table 702 points to all the available table descriptors 704. The table descriptors 704 in turn point to their respective table columns 706. Each table stores multiple columns in the VA memory space. Each of these tables will now be further described.

As noted, root table 702 identifies all the tables accessed by HARP module 204. In some embodiments, each entry in the table takes 8 bytes. When needed, multiple Root Table blocks can be chained by a next pointer. The Descriptor Pointers in the root table 702 points to the individual table descriptors. The indices of the Descriptor Pointers also serve as the table ID. To simplify the hardware design, a CSR (Control Status Register) may be employed to store the Root Table information as long as the hardware accessible Table IDs and Descriptors' information is retained in HARP module 204.

Each database defined table has a table descriptor 704. All the table descriptors 704 may reside in the HARP memory 304. A table descriptor 704 may comprise different groups of data. A group may contain one or more columns. Within a group, the data is organized as rows. A group of data resides in a memory plane which is allocated to it. A data element in a particular plane has direct reference to its corresponding element in another plane. The relationship of the addresses among all the element pairs is the same arithmetical computation. The table descriptor is portable because the present invention utilizes a global virtual address space. In other words, when copying the table descriptor from one virtual memory location to another, all the information in the table is still valid.

In the C2 solution, the data structures of the database are architected to optimize database data processing in HARP hardware. All table columns/column groups, indices and meta-data are defined in a global database virtual address space (DBVA). A reserved DBVA section is allocated for table descriptors 704 as part of the meta-data. Table descriptors 704 include information about a table, such as the table name, number of rows, number of columns/column groups, column names, width(s) within a column group, etc. In addition to the information of data layout and access information in the VA space, the table descriptors 704 also have information about the compression types/algorithms used for each individual column. In the present invention, hardware can directly use this information to accomplish database queries and table element insertion, update, and deletion.

FIG. 8

Table Column Layout

FIG. 8 is now provided to provide further detail on the structure of a table in column-store format as employed by the C2 solution of the present invention. As shown, each database table is broken into multiple columns or column groups having a fixed width. Variable width columns are also supported using column hopping or a column heap structure with linked lists. In the C2 solution, a column group can have one or more columns packed together. Because of the simple arithmetic mapping or the single indirection in the companion column, the hardware and software of the present invention can easily access rows across the columns without any degradation in performance; thus, the C2 solution can provide the same functionality and benefits as known row store databases. Table and column descriptors may also be embedded in the MOPs and query tasks.

Of note, in the present invention, the columns or column groups possess an implicit row id (RID). A RID is considered implicit because it is not materialized as a part of a column or column group. Instead, each column and column group is designated a starting RID, which corresponds to an address in the global database virtual address space, which is then mapped to a physical address in HARP memory 304. Since each column and column group is a fixed width, the RID can provide the basis for arithmetically calculating the memory address of any data in the column or column group.

In some embodiments, all columns are packed together in the single DBVA. In addition, a meta-data structure may be employed to facilitate certain column accesses. For example, as shown, a row pointer primary key index may comprise a sorted list of primary keys and their associated row id (RID) in a column or column group. Of course, a B- tree index may be used as an alternative to this type of index.

In the present invention, two active sets of database regions are maintained, i.e., a main database region and an augment region for newly added data. Query processing operates on both regions and is accelerated by the HARP module 204. The augment region is utilized to hold new inserted items. Optionally, the augment region may be rolled into the main region. For example, as shown in FIG. 8, RIDs 1-*n* are the main region, while RIDs n+1, etc. comprise the augment region.

Deletion updates may be committed into the main region right away. To alleviate the drastic changes across all the columns in a table, the present invention may allocate a valid or invalid bit. A row deletion in a table, therefore, becomes a trivial task of setting the appropriate bit in every column group in the table.

FIG. 9

Example of a SQL Query

FIG. 9 shows one of the 22 TPC-H queries, query #3, and how it would be executed using the machine code database instructions. TPC-H queries are published by the Transaction Processing Performance Council (TPC), which is a non-profit organization to define benchmarks and to disseminate objective, verifiable TPC performance data to the industry. TPC benchmarks are widely used today in evaluating the performance of computer systems. This particular query is a shipping priority query to find the potential revenue and shipping priority of the orders having the largest revenue among those that had not been shipped of a given date. The market segment and date are randomly generated from the prescribed range, and "BUILDING" and Mar. 15, 1995 are the example here. This query is a complex multiple table join of three tables, CUSTOMER, ORDERS, and LINEITEM tables.

C2 Software 110 will decompose this query into 24 MOPs to send to HARP module 204, along with their dependency information, which establishes the topology of the dataflow from MOP to MOP. All MOPs are started and hardware processing begins in pipelined fashion, with each MOP's results being fed to one or more downstream consumers over one or more dedicated logical IMC connections.

The responsibility of the first MOP, ScanCol(0), is to reference HARP memory 304 to find all the customers in the CUSTOMER table who belong to the 'BUILDING' market segment, producing into IMC0 all matching CUSTOMER references in the form of one RID per qualified row. Revindex (1) then traverses a reverse index residing in 304, pre-built to relate customers to their one or more orders residing in the ORDERS table, outputting references to all orders made by the given customers. Because the CUSTOMER references are no longer necessary and to boost performance by reducing utilization of IMC transmission resources over IMC2, the ListProject(2) removes the original customer references after the reverse index join, leaving only the ORDER references. The ScanRPL(3) MOP then scans these orders' O_ORDER-DATE column, retaining ORDER references only to those orders whose order date occurs before the date '1995-03-15'.

Progressing onward through IMC3, the dataflow entering Revindex(4) consists of ORDER table references (RIDs) which have satisfied all criteria mentioned thus far: each order was placed by a customer in the 'BUILDING' market segment before the date Mar. 15, 1995. To finish evaluating the "WHERE" clause of the illustrated SQL query statement, these orders must be qualified in terms of certain properties of their related line items.

The purpose of the Revindex(4) MOP is then to associate each of the qualifying orders to its one or more constituent line items from the LINEITEM table, returning appropriate references thereto. At this point, the flow contains a two-column tuple list relating ORDER references (RIDs) to LINEITEM RIDs, multicasting identical copies of these tuples into IMC4 and IMC5. ListProject(5) extracts only the LINEITEM RID column from the dataflow in preparation for ProjRpl(6), which extracts each line item's L_SHIPDATE column value, feeding these ship dates to IMC7. ListCompose(7) consumes IMC7 along with IMC5, executing a composition of the input lists to create a three-column tuple list where each tuple contains an ORDER RID, an associated LINEITEM RID and its ship date. ListSelect(8) consumes the composed list from IMC 8 and selects only those tuples having ship date older than '1995-03-15', thus completing the "WHERE" clause requirements.

Again, at the output of ListSelect(8), the dataflow still logically appears as a three-column tuple list where each tuple relates an ORDER RID to one of its associated LINEITEM RIDs and that line item's ship date. It should be noted in this flow that multiple distinct LINEITEM RIDs may appear (in different tuples) with an identical ORDER RID, a definite possibility here since a single order may be comprised of an arbitrary number of line items in the target database and this query specifically requests only those line items satisfying the ship date criteria. The redundancy of ORDER RIDs in the list suggests an aggregation step will be needed to realize the SUM of the SQL select statement, but before that, some more data must be gathered and calculations done.

IMC9 and IMC10 both carry the output of ListSelect(8), identically. ListProject(9) extracts only the LINEITEM RID column from IMC9, passing that on to both ProjRpl(12) and ProjRpl(11), which fetch each referenced LINEITEM's L_EXTENDEDPRICE and L_DISCOUNT, respectively. Those procured extended price and discount data are then composed together by ListCompose(13) to form a two-column tuple to be carried via IMC17. ListTupleArith(14) implements the arithmetic process of computing (L_EXTENDEDPRICE*(1−L_DISCOUNT)) on a per-tuple basis before sending this arithmetic result to ListCompose(15). In the meantime, ListProject(10) extracts the ORDER RID column from the output of ListSelect(8), such that ListCompose (15) can make a two-column composition relating, within each tuple, an ORDER RID to its line item's arithmetic product.

The final hardware step to complete the query involves fully evaluating the SELECT clause, including its SUM aggregation function. The remainder of the MOP flow of FIG. 9, beginning with the output of ListCompose(15), is dedicated to this process.

AssocAccumSum(16) receives from IMC19 with each of the two-column tuples relating an ORDER RID to one of its line item's (L_EXTENDEDPRICE*(1−L_DISCOUNT)) product, computing a summation of these values independently for each distinct ORDER RID. For example, a given ORDER RID may appear twice in IMC19 (once in two different tuples), having two distinct LINEITEMs which satisfied all criteria thus far. Each of these LINEITEMs would have generated its own product in ListTupleArith(14), such that the aggregation process of AssocAccumSum(16) must sum them together. The result is a distinct sum of products over each distinct ORDER RID, realizing the SQL SUM aggregation function, here named REVENUE within the query.

Once the aggregation has completed for a given ORDER RID, ListProject(17) extracts the ORDER RID itself, passing it to ProjRpl(18), ProjRpl(19) and ProjRpl(20). These MOPs gather in parallel the referenced orders' O_ORDERDATE, O_SHIPPRIORITY, and O_ORDERKEY, respectively, while ListCompose(21) forms a two-column tuple consisting of O_SHIPPRIORITY and O_ORDERKEY. ListCompose (22) meanwhile forms a two-column tuple comprised of O_ORDERKEY and REVENUE. The final MOP, ListCompose(23), composes the two two-column tuple lists into a final four-column tuple list which satisfies the SQL query and its SELECT statement.

It should be noted in this example that the SQL query SELECT actually stipulates L_ORDERKEY. But an optimization may be applied here, knowing that O_ORDERKEY is functionally equivalent when used in this manner, thus avoiding the need to carry any LINEITEM RIDs beyond IMC11 or IMC12.

FIG. 10

Example of a Dataflow through the HARP

In FIG. 9 we have described how an SQL statement gets mapped into a logical MOP DAG (directed acyclic graph) which gets executed in a dataflow fashion with IMC chaining between MOPs. FIG. 10 illustrates an exemplary dataflow through PEs 620 in HARP logic 302 for the same TPC-H SQL #3 query shown in FIG. 9. As noted, C2 Software 110 will decompose this query task into 10 PE stages to send to HARP module 204, along with their MOP and UOP instructions and dependency information.

Stage 1 is performed by Scanning PE 1002 is to find all the customers in CUSTOMER table that is in "BUILDING" market segment and passes the results (C_RIDs of matching customer records) in an IMC to Indexing PE 1004.

Stage 2 is a join operation of C_CUSTKEY=O_performed by Indexing PE 1004 using a reverse index method. Each C_RID of Stage 1's matching customer records corresponds to an O_RID hitlist of ORDER table records, given a customer may place multiple orders. The results (O_RIDs) are passed in an IMC to Scanning PE 1006.

Stage 3 is performed by Scanning PE 1006 to read the O_ORDERDATE field of all the matching orders (O_RIDs) that Stage 2 outputs, compare for "<'1995-03-15'", and passes the results (O_RIDs) in an IMC to Indexing PE 1008.

Stage 4 is a join operation of O_ORDERKEY=L_ORDERKEY performed by Indexing PE 1008 using a reverse index method. Each O_RID of Stage 3's matching order records corresponds to an L_RID hitlist of LINEITEM table records, given an order may have multiple line items. The results (L_RIDs) are passed in an IMC to Scanning PE 1010.

Stage 5 is performed by Scanning PE 1010 to read the L_SHIPDATE field of all matching line items (L_RIDs) that Stage 4 outputs, compare for ">'1995-03-15'", and passes the results (L_RIDs) in 3 IMCs to Indexing PE 1012, 1014, and 1016.

Stage 6 is a column extraction/projection operation done by Indexing PE 1012, 1014, and 1016 to get L_ORDERKEY, L_EXTENDEDPRICE, and L_DISCOUNT column.

Stage 7 is a list merge operation of 2 columns (L_EXTENDEDPRICE and L_DISCOUNT) done by Indexing PE 1018.

Stage 8 is an aggregation operation of REVENUE of each L_ORDERKEY group, done by XCAM PE 1020 based on outputs of Indexing PE 1012 and 1018. As the SQL statement defines, REVENUE is calculated as the sum of (L_EXTENDEDPRICE*(1−L_DISCOUNT)). Note that even though the GROUP BY defines the group key as concatenation of L_ORDERKEY, O_ORDERDATE, O_SHIPPRIORITY, the group key is simplified to L_ORDERKEY since it is already a unique identifier. The output of XCAM PE 1020 is a pair list of group key (L_ORDERKEY) with its REVENUE.

Stage 9, done by Indexing PE 1022 and 1024, is a column extraction of O_ORDERDATE based on L_ORDERKEY output of XCAM PE 1020.

Stage 10, done by XCAM PE 1026, is a sieve (ORDER BY) operation of REVENUE, O_ORDERDATE to output top N groups with largest REVENUEs. These outputs are placed at a "result" buffer area in HARP memory 304, ready to be retrieved by DBMS software 114.

FIG. 10

Example of a Dataflow Through the HARP

FIG. 10 illustrates an exemplary dataflow through PEs 620 in HARP logic 302 for the same TPC-H SQL #3 query shown in FIG. 9. As noted, C2 Software 110 will decompose this query into 7 query tasks to send to HARP module 204, along with their task command and dependency information.

Task 1 is performed by a Scanning PE is to find all the customers in CUSTOMER table that is in BUILDING market segment and passes the results in an IMC to an Indexing PE.

Task 2 is performed by an Indexing PE to extract the C_CUSTKEY field (column) of Task 1's matching customer records and search against the O_CUSTKEY index table and passes the results in an IMC to a Scanning PE.

Task 3 is performed by the Scanning PE to read the O_ORDERDATE field of all the matching orders that Task 2 returns and passes the results in an IMC. Given a customer could have placed multiple orders, Task 2's CUSTKEY search could result in multi-record hit lists. An Indexing PE then extracts the appropriate records and passes the results in an IMC to a Scanning PE.

Task 4 is performed by a Scanning PE to compare the O_ORDERDATE of each order record from Task 3 and returns only those records with dates before Mar. 15, 1995 in an IMC to a set of Indexing PEs.

Task 5 is performed by a set of Indexing PEs and then an XCAM PE to extract the O_ORDERKEY field of Task 4's qualified orders and search against the L_ORDERKEY index table.

Task 6 is performed by a set of Indexing PEs to extract the L_SHIPDATE field of all the matching line items that Task 5 returns.

Task 7 is then performed by an XCAM PE to compare the L_SHIPDATE of each line item record from Task 6 and sort those records with shipping date later than Mar. 15, 1995. The sorted line item records are placed at a result buffer area in HARP memory 304, ready to be retrieved by DBMS software 114.

Batch Loading

In some embodiments, the fast batch loader is designed to load efficiently a large amount of data for all the tables into an empty database (tables created but no data). In the present invention, the batch loading is accelerated by overlapping the I/O latency between the host system 202 and storage 112 with execution by HARP modules 204. The batch loader also may employ one or more of the machine code database instructions to even further facilitate the speed of the loading. Accordingly, the batch loader of the present invention can parallelize every phase of execution with minimal synchronization and interaction among the threads.

Referring now to FIGS. 11-12, an exemplary batch loader process is shown. In some embodiments, this batch loader may bypass the loader provided by MySQL software 114. For example, as shown in phase 1100, the batch loader may be a shared utility of C2 software 110 and may be started via a user-defined function (UDF) that is submitted to MySQL software 114. In response, HARP modules 204 may begin loading the various input files specified in the UDF, for example, via file transfer protocol or secure file transfer. In essence, HARP memory 304 becomes a staging cache for the batch loader.

In phase 1102, C2 software 110 may then utilize an input data profiler to sample the input files, determine heuristically the specific compression scheme and column/token widths for all the columns and then set them through a data definition into empty tables. In particular, C2 software 110 may sample a relatively small portion of the load file and determine an initial compression scheme, column/token widths for all the columns and use this as an initial data definition for the empty tables. However, as will be described, C2 software 110 may monitor the batch load and reorganize the tables as necessary as more data from the load file is sampled.

In phase 1104, C2 software 110 may begin loading the data from a load file into empty tables. As data is loaded, C2 software 110 in phase 1106 may continually check to see if the table structure is suitable to hold the data from the load file. If the table is not suitable to hold the data, (e.g., the column width is insufficient for data), then C2 software 110 may reorganize the tables in phase 1108.

In phase 1108, during loading, there may be columns needing reorganization because the column/token widths chosen heuristically by the input data profiling are not enough. The reorganization can be done in parallel with the index building phase to hide the latency since the index building actually has no real dependency on the reorganization. Rows with errors, such as parsing errors or uniqueness violations etc., may be marked as deleted at the end of each phase. After loading, HARP modules 204 may begin prefetching to get ready for coming queries.

For example, during the reorganization of phase 1108, C2 software 110 may increase the column width of a table to accommodate data from the load file. In addition, C2 software 110 may then reorganize the previous entries in that column with the new larger width. Such mechanisms and data definition may be known to those skilled in the art. As noted, C2 software 110 may perform this sampling and reorganization to determine a structure for the tables to be suitable. Of course, C2 software 110 may also perform other processes, such as attempting different compression schemes to optimize the structure of the tables receiving the data from the load file.

If the table is suitable, then in phase 1110, C2 software 110 may continue with loading the data into the tables. Phase 1110 will now be further described with reference to FIG. 12.

As shown, in phase 1200, the input data is compressed by software running on host 202 based on the profile determined by C2 110. In phase 1202, host 202 may then store the data into storage 112.

In phase 1204, host 202 also sends the compressed data to HARP 204. In phase 1206, the profiling by C2 software 110 is then also used in HARP 204 to determine a balanced index structure for the new data so that it can be efficiently searched. If data is needed for index profiling, then the value is multicast via a MOP to HARP module 204. The result is then passed back to the host system 202 to determine an appropriate partition size for the index. For small histograms, data may be passed back to host system 202 via a DMA from storage manager 420.

Unlike regular DML insert that builds/updates various indices along the way, the batch loader may defer index building to be after all the input for the table has been completed. Nonetheless, during the input phase, HARP modules 204 are utilized to build histogram profiles 1208 of the index data, e.g. for date range index the number of RIDs for each date value, which enables balanced and precise partitioning later.

In phase 1206, HARP modules 204 partition data accordingly and C2 software 110 may sort, if necessary. HARP modules 204 may build with parallel threads 1210 the index chunk by chunk directly into their final locations without lookup or shuffling data. Ideally, sorting is taken care of by HARP module 204, in parallel in the input phase based on executing the appropriate machine code database instructions (MOPs). In the input phase, input files are processed one table at a time (tables are ordered according to the dependencies of their PK-FK relationship) sequentially. The execution is then parallelized by columns.

After reading a chunk of the data, a pool of threads will each process, i.e. parse, encode, and send them to SM 420, one column of data in the current input. This makes it trivial to keep the correlation of row data among the columns. It also allows the thread to work independently, specifically for columns using dictionary avoiding token by token synchronization. If the column is related to an index (pk, fk, columns with date range index or text index), the data is also transferred to HARP modules 204 to be processed in parallel. After the input for a table, C2 software 110 builds the indices one at a time with the pool of threads.

For large tables, one index at a time is processed by C2 software. In other embodiments, multiple indices of small tables may be built at the same time as resources permit to keep high utilization of the system 100.

Returning now back to FIG. 11, in phase 1112, the load process may continue until the data from the load file has been placed into tables in storage 112. If the load is not complete, then the process may repeat at phase 1104. Otherwise, the batch load process may then complete at phase 114.

Incremental Loader

In some embodiments, the incremental loader is designed for efficient loading of incremental data into the database. Referring now to FIG. 13, the incremental loader may be one of the shared utilities of C2 software 110 and may be invoked at phase 1300 by a user defined function (UDF). For example, this UDF could be the same UDF for fast loading except with different command line parameters. The actual files containing the data to be loaded incrementally are expected to be in storage 112.

In phase 1302, C2 software 110 will profile the data using an input data profiler. The input data profiler will profile the data and come up with the max and min values of the incremental data to be loaded in a manner similar described above.

In phase 1304, the incremental loader begins its load of data into empty or non-empty tables, depending on the profile of the data determined above. In some embodiments, the batch loader infrastructure described above is also used for incrementally loading the column group data. For example, the column group data is loaded from a memory mapped file in storage 112 and segments and the new 'incremental' data segment is generated by C2 software 110. The process of loading the incremental data to segments may thus be the same as in the batch loading described above.

One difference between the batch loader and incremental loader is that data loaded through the incremental loader may be loaded into a table that already holds some data, while the bulk loader generally loads data into an empty table. The incremental loader may also have its operations 'logged' by the log manager in shared utilities 426. Batch loading generally synchronizes or flushes all the data to a table, and thus, does not require the use of logging. ACID (Atomic, Consistent, Isolated, and Durable) properties can be maintained during incremental loading and batch loading.

As data is loaded, C2 software 110, in phase 1306 may continually check to see if the table structure is suitable to hold the data from the load file. If the table is not suitable to hold the data, (e.g., the column width is insufficient for data), then C2 software 110 may reorganize the tables in phase 1308.

In phase 1308, during loading, there may be columns needing reorganization because the column/token widths chosen heuristically by the input data profiling are not enough. The reorganization can be done in parallel with the index building phase to hide the latency since the index building actually has no real dependency on the reorganization. Rows with errors, such as parsing errors or uniqueness violations etc., may be marked as deleted at the end of each phase. After loading, HARP modules 204 may begin prefetching to get ready for coming queries.

For example, during the reorganization of phase 1308, C2 software 110 may increase the column width of a table to accommodate data from the load file. In addition, C2 software 110 may then reorganize the previous entries in that column with the new larger width. Such mechanisms and data definition may be known to those skilled in the art. As noted, C2 software 110 may perform this sampling and reorganization to determine a structure for the tables to be suitable. Of course, C2 software 110 may also perform other processes, such as attempting different compression schemes to optimize the structure of the tables receiving the data from the load file.

If the table is suitable, then, in phase 1310, C2 software 110 may continue with loading the data into the tables. Phase 1310 will now be further described with reference to FIG. 14. As shown, in phase 1400, the input data is compressed by software running on host 202 based on the profile determined by C2 110. In phase 1402, host 202 may then store the data into storage 112.

In addition, in phase 1406, in HARP modules 204, the data in a snapshot is written and updated to commit the data being added to the tables. In some embodiments, this operation may be performed using a machine code database instruction, such as an associative accumulation MOP. Such an operation is further described with reference to FIGS. 15-16.

In phase 1408, the incremental loader may then update its index and send an update to storage 112. In addition, in parallel, host 202 may also be updating its index and updating the indexes in storage 112 as well. In some embodiments, a deferred update approach can be taken when possible for incremental index building as described below.

An index can be created on a column. Every DML or incremental load may then perform insert/delete/update to the index. This index will be referred to as the master index of that column. A master index can refer to indexes of type: RI, B+Tree TI, SI, TI, DRI.

A B− tree can also be used to hold the deferred updates to the following types of master indexes: reverse index (RI), B+ tree, TI, or DRI). This structure that holds the deferred updates can be referred to as the delta B+ tree. Each Index (RI, DRI, and TI) can potentially contain a delta B+ tree associated with it. The delta B+ tree key and value data types can match to the corresponding master index. However, there may be an additional bit that is a part of the 'value' that specifies whether the entry in the B+ tree corresponds to an insert or delete.

During DML or Incremental data loading, Insert/Update/Deletes to the indexes may or may not be applied to the master index. If the page containing the index data to be modified is present in the buffer cache, the changes are made to the actual index page (master index). If the page is not in the cache, the modifications are made to a delta B+ tree. A background process will be in charge of folding the delta B+ Tree values into the actual Index data structures. The background process to perform this task may wake up periodically or can be posted before a sync operation has to be performed.

Referring now back to FIG. 13, in phase 1312, the load process may continue until the data from the load file has been placed into tables in storage 112 and the indexes updated. If the load is not complete, then the process may repeat at phase 1304. Otherwise, the batch load process may then complete at phase 1314.

FIGS. 15-16 illustrate associative accumulation machine code database instructions that may be employed to write data into pages in the memory of HARP modules 204. In particular, FIG. 15 illustrates a full replace function, while FIG. 16 illustrates a selective replace function.

In general, an associative operation implemented by XCAM PE 624 involves the writing of each input value, mapped by its associated key value, to a corresponding location in HARP memory 304. Since the input keys may vary arbitrarily in their order and value, this process can implement a scattering of writes to desired portions of HARP memory 304. The scattering writes may be performed in a manner particularly useful for making anything from large, sweeping to small, incremental updates of database column contents. As noted, at least two approaches may be available: full replace shown in FIG. 15 and selective replace shown in FIG. 16.

The full replace function (or coalescing form) shown in FIG. 15 first collects writes to adjacent memory locations over a window of address space, before dispatching them to HARP memory 304. While avoiding reads of original memory contents, coalescing takes advantage of the potential for spatial locality in the input key stream, thereby minimizing the write and nullifying the read bandwidth required, to provide a high performance solution for executing updates of memory 304. Since reads are avoided and since the granularity of the update size can be much less than that of the coalescing window, any key location not addressed within the window may have its associated memory contents cleared to a constant value or assigned otherwise undefined data. A small cache may be utilized to perform the coalescing.

Referring now to FIG. 16, the selective replace function is shown. This function may also be considered a non-coalescing form and may be more precise and selective in updating HARP memory 304, preserving data in adjacent locations, but may utilize higher memory read and write bandwidth requirements. This approach is especially useful for small update granularity (e.g. 1-bit) where spatial locality cannot be guaranteed among the updates requested in the input stream and preservation of surrounding data is necessary. Again, a small cache may be used to mitigate unnecessary memory accesses, in an opportunistic manner.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system configured to load data into a relational database, said system comprising:
    a host configured to receive a request to load data from a load file into a database, sample the load file; determine a first profile of the load file based on the samples; determine at least one compression scheme for the data in the load file based on its profile; and compress the data in the load file based on the at least one compression scheme as the data is loaded into the database; and
    at least one hardware accelerator comprising a memory for storing compressed data that is to be indexed and a processor configured to determine a second profile of the compressed data that is to be indexed based on a machine code database instruction, divide the compressed data that is to be indexed into a set of balanced partitions based on the second profile, execute a program of machine code database instructions based on the second profile, wherein the program of machine code database instructions instruct the hardware accelerator to distribute the compressed data that is to be indexed in the hardware accelerator memory into partitions in the hardware accelerator's memory, build, in parallel, a sub-index for each partition of the compressed data that is to be indexed, and determining an index based on a combination of the sub-indexes.

2. A system configured to load data in existing tables of a database, said system comprising:
    a host configured to retrieve a portion of the data to be loaded, identify a compression scheme used to store data in the database, determine whether the identified compression scheme is optimum based on the data to be loaded, load the data into the database based on the identified compression scheme when the compression is optimum, determine a new compression scheme when the identified scheme is not optimum, reorganizing a portion of the database based on the new compression scheme, load the data into the database based on the new compression scheme when the identified scheme was not optimum; and
    at least one hardware accelerator configured by a program database machine code to determine columns of data in the database that are indexed, and update, in parallel, indexes for the indexed columns of data.

3. A method of writing data to a memory coupled to a database hardware accelerator based on scattered writes/reads, said method comprising:
    identifying contiguous sequential ranges of scattered data stored in a database storage;
    gathering scattered index data into the memory of the database hardware accelerator;
    updating the collected data in the memory using a database operator; and
    distributing the updated data back to the scattered locations in the database storage.

* * * * *